US008725675B2

(12) United States Patent
Moriwake et al.

(10) Patent No.: US 8,725,675 B2
(45) Date of Patent: May 13, 2014

(54) FILE SERVER, FILE MANAGEMENT SYSTEM AND FILE RELOCATION METHOD

(75) Inventors: Shinichi Moriwake, Yokohama (JP);
Nobuyuki Saika, Yokosuka (JP);
Hitoshi Kamei, Sagamihara (JP);
Takahiro Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 63 days.

(21) Appl. No.: 13/317,355

(22) Filed: Oct. 17, 2011

(65) Prior Publication Data

US 2012/0079196 A1 Mar. 29, 2012

Related U.S. Application Data

(63) Continuation of application No. 12/385,534, filed on Apr. 10, 2009, now Pat. No. 8,065,305.

(30) Foreign Application Priority Data

Feb. 10, 2009 (JP) ................................. 2009-028559

(51) Int. Cl.
*G06F 7/00* (2006.01)
*G06F 17/00* (2006.01)

(52) U.S. Cl.
USPC .......................................... 707/602; 707/785

(58) Field of Classification Search
USPC ................................................. 707/602, 785
See application file for complete search history.

(56) References Cited

U.S. PATENT DOCUMENTS

| 7,469,315 | B2 | 12/2008 | Watanabe et al. | |
|---|---|---|---|---|
| 7,836,251 | B2 | 11/2010 | Watanabe et al. | |
| 2002/0120763 | A1* | 8/2002 | Miloushev et al. | 709/230 |
| 2007/0091497 | A1* | 4/2007 | Mizuno et al. | 360/51 |
| 2007/0143542 | A1* | 6/2007 | Watanabe et al. | 711/114 |
| 2007/0242385 | A1 | 10/2007 | Yamamoto et al. | |
| 2008/0126702 | A1 | 5/2008 | Zimoto et al. | |
| 2008/0144086 | A1* | 6/2008 | Shibao | 358/1.15 |
| 2008/0270696 | A1 | 10/2008 | Murayama et al. | |
| 2009/0006877 | A1 | 1/2009 | Lubbers et al. | |
| 2009/0235269 | A1 | 9/2009 | Nakajima et al. | |
| 2009/0254701 | A1 | 10/2009 | Kurokawa et al. | |
| 2010/0049916 | A1 | 2/2010 | Nakajima et al. | |

FOREIGN PATENT DOCUMENTS

| JP | 2007-018483 | 1/2007 |
|---|---|---|
| JP | 2008-134829 | 6/2008 |

* cited by examiner

*Primary Examiner* — Hosain Alam
*Assistant Examiner* — Van Oberly
(74) *Attorney, Agent, or Firm* — Stites & Harbison, PLLC; Nicholas B. Trenkle

(57) ABSTRACT

In a file server for suppressing power consumption of a storage apparatus, when a file sharing program receives a file access from a client, the program references a mapping table. The program addresses the access to the target file in the volume of a RAID group where the target file is stored. A coupling-request reception program memorizes a coupling time for each user into a coupling history table. A grouping program applies a grouping to users whose coupling time-zones are similar. A data transfer program transfers, into the same RAID group, data of the files associated with the grouped users, thereby collecting the data into the same RAID group. Thus, the time-zone when no access is made to the RAID group (i.e., non-coupling time-zone) can be made longer. Accordingly, a spin-up/down request program makes a spin-down request to the RAID group in the non-coupling time-zone.

9 Claims, 31 Drawing Sheets

FIG. 3
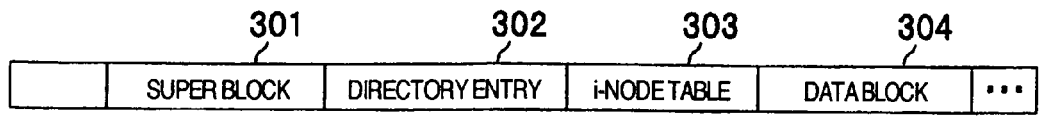
FIG. 4
302 DIRECTORY ENTRY
| DIRECTORY PATH NAME | i-NODE NUMBER |
|---|---|
| /home/user-01/···/a.txt | 100 |
| /home/user-02/···/b.txt | 200 |
| : | : |
FIG. 5
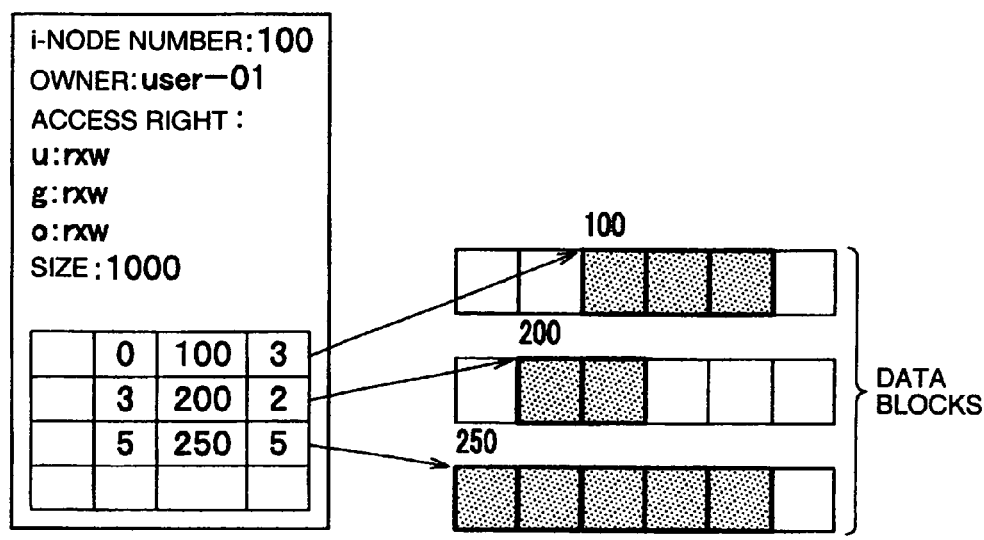

HIERARCHICAL MANAGEMENT TABLE 4000

| MOUNT PATH | FSID | HIERARCHY |
|---|---|---|
| /EXPORT | 0x01 | 0x00 |
| /Tier1 | 0x01 | 0x0F |
| /Tier2 | 0x02 | 0x11 |

HIERARCHICAL DATA LIST 5000

| MOUNT PATH | FSID | POINTER |
|---|---|---|

FIG. 12

8100 COUPLING HISTORY TABLE

| TIME-AND-DATE | USER NAME | OCCURRENCE EVENT |
|---|---|---|
| 2008/01/05 11:00:05 | user001 | RECEIVING COUPLING REQUEST |
| 2008/01/05 11:03:05 | user002 | RECEIVING COUPLING REQUEST |
| ⋮ | ⋮ | ⋮ |
| 2008/01/05 11:15:00 | user001 | RECEIVING DECOUPLING REQUEST |
| 2008/01/05 12:00:00 | ******* | TIME-OUT (NAS EXECUTES DECOUPLING) |
| ⋮ | ⋮ | ⋮ |
| ⋮ | ⋮ | ⋮ |

8200 SIMILAR-ACCESS USER GROUP MANAGEMENT TABLE

| GROUP NAME | USER NAME |
|---|---|
| GroupA | user001 |
| GroupA | user002 |
| GroupB | user003 |
| ⋮ | ⋮ |
| ⋮ | ⋮ |

8300 NON-COUPLING TIME-ZONE MANAGEMENT TABLE

| GROUP NAME (8301) | NON-COUPLING TIME-ZONE (8302) |
|---|---|
| GroupA | 09:00:00 – 11:00:00 |
| GroupA | 17:00:00 – 22:00:00 |
| GroupB | 15:00:00 – 17:00:00 |
| GroupB | 18:00:00 – 22:00:00 |
| ⋮ | ⋮ |

FIG. 15

8400 SIMILAR-ACCESS FILE GROUP MANAGEMENT TABLE

| GROUP NAME (8401) | FILE NAME (8402) |
|---|---|
| GroupA | /home/share/a.txt |
| GroupA | /home/share/b.txt |
| GroupB | /home/share/c.doc |
| GroupB | /home/share/x.xls |
| GroupB | /home/share/z.ppt |
| ⋮ | ⋮ |

FIG. 33

8500 ACCESS LOG

| USER NAME | FILE NAME | FILE SIZE (ACCUMULATED-ACCESSES AMOUNT) | I/O TYPE |
|---|---|---|---|
| user001 | /home/share/a.txt | 20MB | read |
| user002 | /home/share/b.txt | 15MB | read/write |
| ⋮ | ⋮ | ⋮ | ⋮ |
| ⋮ | ⋮ | ⋮ | ⋮ |
| ⋮ | ⋮ | ⋮ | ⋮ |

ACCESS-LOG ACQUISITION POSSIBILITY/IMPOSSIBILITY JUDGMENT TABLE 8600

| FILE NAME | ACCESS-LOG ACQUISITION |
|---|---|
| /home/user001/a.txt | ON |
| /home/user002/b.txt | ON |
| ⋮ | ⋮ |

| TARGET ENTITY | OPERATION PATTERN (OPERATION TIME) |
|---|---|
| A | 00:00-02:00, 06:00-12:00, 19:00-22:00 |
| B | 03:00-05:00, 13:00-16:00, 18:00-19:00 |
| C | 00:15-02:20, 05:45-12:25, 18:50-22:15 |
| D | 03:15-05:20, 13:05-16:10, 18:00-19:00 |
| E | -    , 13:20-15:35,    - |

FIG. 39A

| TIME / TARGET ENTITY | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| A |  | ■ |  |  |  |  | ■ | ■ | ■ | ■ | ■ | ■ |  |  |  |  |  |  |  | ■ | ■ | ■ |  |  |
| B |  |  |  | ■ | ■ |  |  |  |  |  |  |  |  | ■ | ■ | ■ |  |  | ■ |  |  |  |  |  |
| C |  | ■ |  | ■ | ■ |  | ■ | ■ | ■ | ■ | ■ | ■ |  |  |  |  |  |  |  | ■ | ■ | ■ |  |  |
| D |  |  |  |  |  |  |  |  |  |  |  |  |  | ■ | ■ | ■ |  |  | ■ |  |  |  |  |  |
| E |  |  |  |  |  |  |  |  |  |  |  |  |  |  |  |  |  |  |  |  |  |  |  |  |

FIG. 39B

| TIME / group | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Group1 | ■ | ■ |  | ■ | ■ |  | ■ | ■ | ■ | ■ | ■ | ■ |  |  |  |  |  |  |  | ■ | ■ | ■ |  |  |
| Group2 |  |  |  |  | ■ |  |  |  |  |  |  |  |  | ■ | ■ | ■ |  |  | ■ |  |  |  |  |  |

FIG. 40

| TARGET ENTITY \ TIME | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| A | ■ | ■ |  |  |  |  | ■ | ■ |  | ■ | ■ | ■ |  |  |  |  |  |  |  | ■ | ■ | ■ |  |  |
| B |  |  |  | ■ | ■ |  |  |  |  |  |  |  |  | ■ | ■ | ■ |  |  | ■ |  |  |  |  |  |
| C | ■ | ■ |  |  |  |  | ■ | ■ |  | ■ | ■ | ■ |  |  |  |  |  |  | ■ | ■ | ■ | ■ |  |  |
| D |  |  |  | ■ | ■ |  |  |  |  |  |  |  |  | ■ | ■ | ■ |  |  | ■ |  |  |  |  |  |
| E |  |  |  |  |  |  |  |  |  |  |  |  |  | ■ | ■ | ■ |  |  |  |  |  |  |  |  |
| F | ■ | ■ | ■ | ■ | ■ | ■ | ■ | ■ | ■ | ■ | ■ | ■ | ■ | ■ | ■ | ■ | ■ | ■ | ■ | ■ | ■ | ■ | ■ | ■ |

FILE SERVER, FILE MANAGEMENT SYSTEM AND FILE RELOCATION METHOD

CROSS-REFERENCE TO RELATED APPLICATION

This application is a Continuation of U.S. application Ser. No. 12/385,534 filed on Apr. 10, 2009 now U.S. Pat. No. 8,065,305. Priority is claimed based upon U.S. application Ser. No. 12/385,534 filed on Apr. 10, 2009, which claims the priority date of Feb. 10, 2009, the filing date of the corresponding Japanese Patent Application No. 2009-028559, the content of which is hereby incorporated by reference into this application.

BACKGROUND OF THE INVENTION

1. Field of the Invention

The present invention relates to technologies for relocating files memorized in a storage apparatus. More particularly, it relates to a file server, file management system, and file relocation method capable of suppressing power consumption of the storage apparatus.

2. Description of the Related Art

In recent years, there has been a rapid increase in the needs for a file service which utilizes a file management system including a file server (NAS (: Network Attached Storage) apparatus) for managing the file management system and one or more storage apparatuses for storing files of the file management system. In accompaniment with this rapid increase, the capacity of a file to be stored into each storage apparatus also exhibits a tendency to increase, and the unit number of disk devices constituting each storage apparatus also exhibits the tendency to increase. This increase in the unit number of the disk devices gives rise to the occurrence of an increase in power consumption of the entire storage apparatus. In particular, in a large-capacity disk array system on which a large number of disk devices are mounted, and in which a plurality of disk devices constitute a RAID (: Redundant Array of Inexpensive Disks), the suppression of this power-consumption increase in the entire storage apparatus has become a serious problem.

In JP-A-2007-18483, the following disclosure has been made: When the NAS receives a file open request from a host computer, the NAS identifies a logical volume which stores the open target therein. Then, if the number of files in the open target stored in the logical volume is equal to zero, the NAS instructs start-up of disk devices and fan devices.

Also, in JP-A-2008-134829, the disclosure has been made concerning a constitution whereby the power-saving of storage apparatuses in a storage system is made implementable from a management apparatus. Namely, the storage system includes a power-saving instruction receiving unit for receiving, from a management console, a power-saving instruction for specifying a storage apparatus in a RAID group, and a power-saving control unit for implementing the power-saving of one or more physical storage apparatuses corresponding to the storage apparatus specified by this power-saving instruction.

SUMMARY OF THE INVENTION

According to the technology disclosed in JP-A-2007-18483, however, start-up of the storage apparatus is performed even if only a single file is opened. This start-up makes it possible to ensure a halt time for the spin-down state, thereby resulting in insufficient implementation of the power-saving effect.

The NAS allows implementation of a file sharing by receiving file access requests from a large number of users, and performing Read/Write processings corresponding thereto. The file stored on a LU (: Logical Unit), coupled to the NAS is accessed for each individually-different user and with each individually-different timing (i.e., time-zone). On account of this, the time-zone during which no access is made becomes short in all of RAID groups. Accordingly, a time is short that is needed for setting the RAID group, to which the file-stored LU belongs, into the spin-down state (: low-rotation state), or into the spin-off state (: halt state). This short time results in insufficient implementation of the power-saving effect.

The present invention has been devised in order to solve the above-described problems. Namely, it is an object of the present invention to provide a file server, file management system, and file relocation method capable of suppressing the power consumption of a storage apparatus.

In order to accomplish the above-described object, when the file server of the present invention receives a file access made from a client, the file server makes reference to a mapping table. Then, the file server addresses the access to the target file in the volume of a RAID group in which the target file is stored. Next, the file server memorizes, into a coupling history table, a coupling time-zone for each user that has established the coupling to the file server. Moreover, the file server applies a grouping to the users whose coupling time-zones are similar to each other. Furthermore, the file server transfers, into the same RAID group, data of the files associated with the grouped users, thereby collecting the data of the files into the same RAID group. On account of this, the time-zone during which no access is made (i.e., non-coupling time-zone) can be made longer with respect to the RAID group into which the data has been collectzzed. Accordingly, the spin-down is applied to the RAID group in the non-coupling time-zone. Also, the spin-up is applied to a RAID group in the coupling time-zone (i.e., no spin-down is applied thereto).

Incidentally, a file system which is constituted by virtually integrating a plurality of real file systems to each other is used as the file system managed by the file server. Based on this virtualization of the real file systems, the file server does not permit the user to see one or more real file systems created into one or more logical volumes, but permits the user to see the integrated file system (i.e., virtual file system) constituted by virtually integrating the plurality of real file systems to each other. Consequently, even if the transfer of a file has been performed, and the real file system in which the file is stored has changed, the user, who can see only the integrated file system, can execute the access to the file without being conscious of this change in the integrated file system.

According to the present invention, it becomes possible to suppress the power consumption of a storage apparatus.

BRIEF DESCRIPTION OF THE DRAWINGS

FIG. 3 is a diagram for illustrating an example of the structure of the file system;

FIG. 4 is a diagram for illustrating an example of the data structure of the directory entry;

FIG. 5 is a diagram for illustrating the reference relationship between the i node and the data block;

FIG. 12 is a diagram for illustrating the data structure of the coupling history table;

FIG. 13 is a diagram for illustrating the data structure of the similar-access user group management table;

FIG. 14 is a diagram for illustrating the data structure of the non-coupling time-zone management table;

FIG. 15 is a diagram for illustrating the data structure of the similar-access file group management table;

FIG. 33 is a diagram for illustrating the data structure of access log;

FIG. 34 is a diagram for illustrating the data structure of an access-log acquisition possibility/impossibility judgment table;

FIG. 38 is a diagram for illustrating a case instance of the operation pattern of target entities;

FIG. 39A and FIG. 39B are diagrams for illustrating a bit map of the operation time of the target entities; and FIG. 40 is a diagram for illustrating another bit map of the operation time of the target entities.

DESCRIPTION OF THE INVENTION

Hereinafter, based on the drawings, the detailed explanation will be given below concerning embodiments of the present invention. Incidentally, the present invention is not limited by these embodiments.

Embodiment 1

Figure 1:
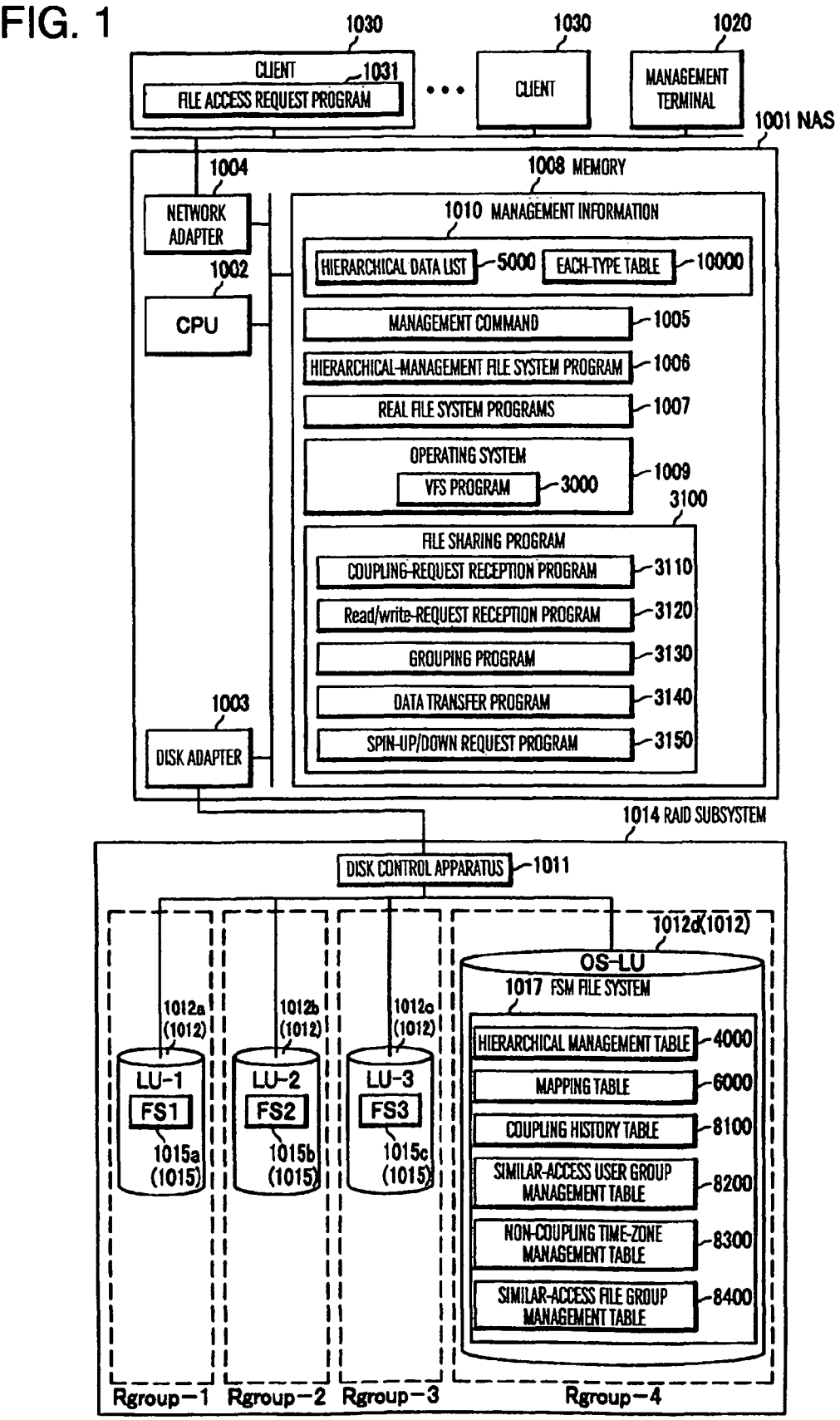
FIG. 1 is a diagram for illustrating a constitution example of a file management system to which the present invention is applied.

FIG. 1 is a diagram for illustrating a constitution example of a file management system to which the present invention is applied. The file management system includes a NAS 1001 (i.e., file server), a RAID subsystem 1014 (i.e., storage apparatus) coupled to the NAS 1001, a management terminal 1020, and clients 1030.

A plurality of RAID groups are created in the RAID subsystem 1014. A volume is provided on each RAID group. In some cases, the volume is also referred to as "logical volume or LU (Logical Unit)". In the present embodiment, there exist a plurality of LUs (1012) (i.e., LU-1 (1012a), LU-2 (1012b), LU-3 (1012c), and OS-LU (1012d)). The details of the LUs will be described later.

The NAS 1001 and the RAID subsystem 1014 are coupled to each other via, e.g., a SAN (Storage Area Network). Also, the management terminal 1020, the clients 1030, and the NAS 1001 are coupled to each other via, e.g., a LAN (Local Area Network). Incidentally, in some cases, the management terminal 1020 is regarded as a computer which is basically the same as each client 1030.

The NAS 1001 is a computer which installs the following constitution components therein: A CPU (Central Processing Unit) 1002, a disk adapter 1003 used for communications with the RAID subsystem 1014, a network adapter 1004 used for communications with the management terminal 1020 and the clients 1030, and a memory 1008 for storing programs to be executed by the CPU 1002 and data. These components are coupled to each other via an internal communications path (e.g., bus). Incidentally, when the NAS 1001 establishes the coupling to the RAID subsystem 1014 by using the disk adapter 1003, the NAS 1001 establishes the coupling via a FC path. The FC path is distributed to the RAID groups in operation.

As described above, the memory 1008 of the NAS 1001 stores the programs and data therein. Concretely, the memory

1008 stores therein a management command 1005, a hierarchical-management file system program 1006, real file system programs 1007, an operating system 1009, management information 1010, and a file sharing program 3100.

The management command 1005 is a command for managing HSM (Hierarchical Storage Management) function provided by the NAS 1001. The hierarchical-management file system program 1006 is a program for implementing hierarchization of the file system, and playing a central role of the HSM function provided by the NAS 1001.

The hierarchical-management file system program 1006 is the program for performing hierarchical-management participation processing, hierarchical-management withdrawal processing, management-information restructure processing, hierarchical displacement processing, Lookup processing, Create processing, Mkdir processing, and Readdir processing.

The real file system programs 1007 is a program for managing FS1 (1015*a*), FS2 (1015*b*), and FS3 (1015*c*), which are file systems on the LUs 1012 created in the RAID groups (Rgroups) of the RAID subsystem 1014. Incidentally, FS is an abbreviation for File System.

The operating system 1009 is a program for managing the entire NAS 1001. The operating system 1009 includes therein a VFS (Virtual File System) program 3000, which will be described later.

The file sharing program 3100 is a program for receiving a management instruction request from the management terminal 1020, and a file access request (which, in some cases, will be simply referred to as "access request" for convenience of the explanation) from a file access request program 1031 of each client 1030, and managing files on the basis of the access request from a user. The file sharing program 3100 includes, as subprograms, a coupling-request reception program 3110 (refer to FIG. 26), a Read/Write-request reception program 3120 (refer to FIG. 27), a grouping program 3130 (refer to FIG. 28), a data transfer program 3140 (refer to FIG. 30), and a spin-up/down request program 3150 (refer to FIG. 29).

The management information 1010 is management data for providing the HSM function. Each-type table 10000 included in the management information 1010 is a generic name for the following tables: A hierarchical management table 4000 (refer to FIG. 8), a mapping table 6000 (refer to FIG. 11), a coupling history table 8100 (coupling history information) (refer to FIG. 12), a similar-access user group management table 8200 (similar-access user group management information) (refer to FIG. 13), a non-coupling time-zone management table 8300 (non-coupling time-zone management information) (refer to FIG. 14), and a similar-access file group management table 8400 (similar-access file group management information) (refer to FIG. 15), which will be described later. These tables are created temporarily in the memory area of the memory 1008 by processings performed in the NAS 1001. The tables created are stored into the RAID subsystem 1014.

The coupling-request reception program 3110 (refer to FIG. 26) is a program for receiving a log-in request and log-out request from each client 1030, acquiring time-and-date of the coupling/decoupling from each client 1030 to/from the NAS 1001, and registering the coupling history on access requests into the coupling history table 8100 (refer to FIG. 12). Incidentally, the coupling history includes coupling history from the management terminal 1020 as well.

The Read/Write-request reception program 3120 (refer to FIG. 27) is a program for performing a file Open processing, a file Close processing, a file Read processing, and a file Write processing after the access request has been received.

Figure 31:
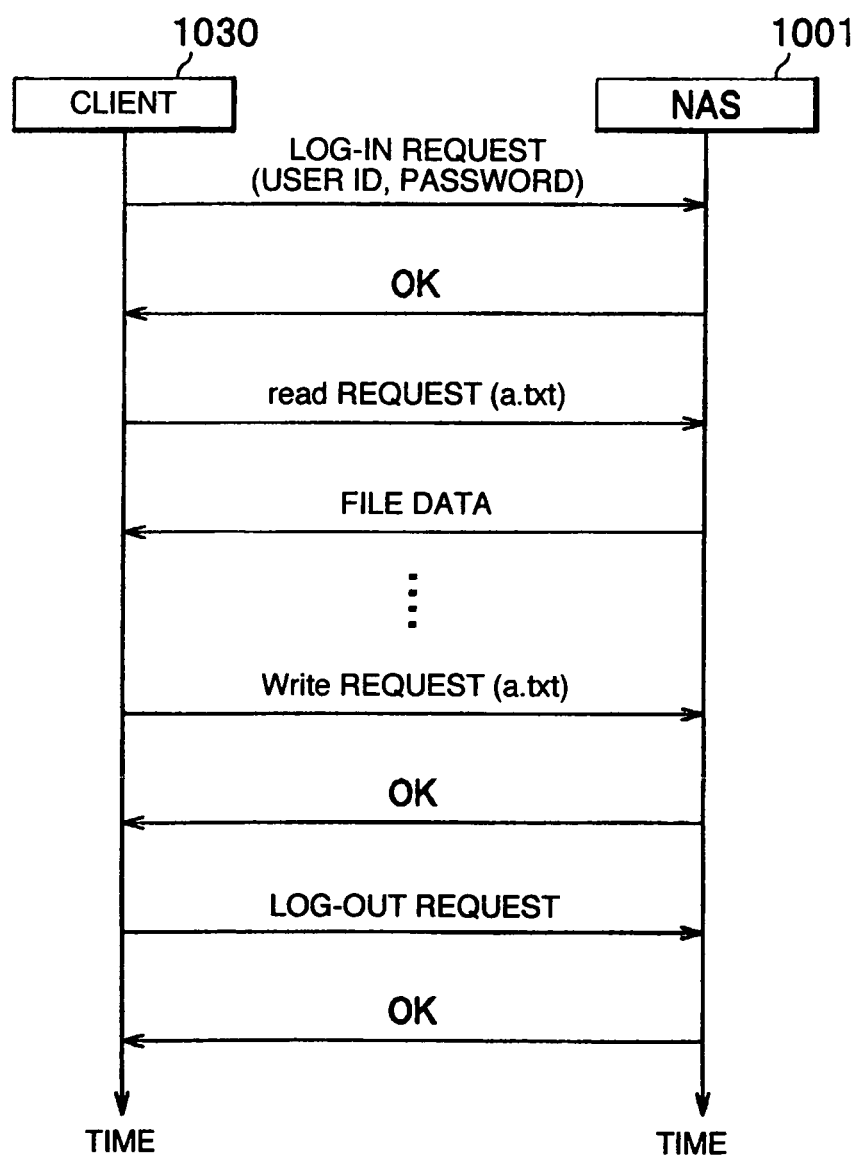
FIG. 31 is a diagram for illustrating the response of the NAS in the case where a file access is made from a client.

FIG. 31 is a diagram for illustrating the response of the NAS 1001 in the case where a file access request is made from each client 1030. When a client 1030 makes the log-in request to the NAS 1001 along with its user ID and password, the NAS 1001 returns an OK response thereto. Moreover, if the client 1030 makes a read request for a.txt, the NAS 1001 transmits file data on a.txt. Also, if the client 1030 makes a write request for a.txt, the NAS 1001 returns an OK response thereto after writing the file data on a.txt into the RAID subsystem 1014. Furthermore, if the client 1030 makes the log-out request to the NAS 1001, the NAS 1001 returns an OK response thereto. Incidentally, the coupling-request reception program 3110 of the NAS 1001 manages, as the coupling time-zone for each user (i.e., user name or user ID), the time-interval ranging from a point-in-time of the response to the log-in request to a point-in-time of the response to the log-out request. Namely, the coupling-request reception program 3110 manages the time before the log-in and the time after the log-out as the non-coupling time-zone for each user.

Getting back to FIG. 1, the grouping program 3130 (refer to FIG. 28) is the following program: Based on the user history information, the grouping program 3130 extracts the non-coupling time-zone for each user. Next, the program 3130 applies a grouping to the users for each similar non-coupling time-zone, then outputting the users-grouped result to the similar-access user group management table 8200 (refer to FIG. 13). Moreover, the program 3130 establishes a one-to-one correspondence between the non-coupling time-zone and each group, then outputting the correspondence result to the non-coupling time-zone management table 8300 (refer to FIG. 14). Furthermore, the program 3130 retrieves an accessible file from each user name registered in the similar-access user group management table 8200, then outputting the retrieval result to the similar-access file group management table 8400 (refer to FIG. 15). Finally, the program 3130 calls for the data transfer program 3140.

The data transfer program 3140 (refer to FIG. 30) is a program for transferring a file, which is stored in a certain volume (or RAID group) of the RAID subsystem 1014, into another volume (or RAID group) of the RAID subsystem 1014.

The spin-up/down request program 3150 (refer to FIG. 29) is a program for performing the spin-up of a RAID group (i.e., raising rotation speed of platters of the hard disks up to a specified value) created in the RAID subsystem 1014, or the spin-down of a RAID group (i.e., lowering rotation speed of platters of the hard disks down to a specified value). Incidentally, the above-described spin-up/down processings may also be executed by fabricating a recording medium which stores the program 3150 therein, and by the NAS 1001's reading and executing the program out of the recording medium. Additionally, the spin-up of a RAID group is also allowed to refer to a processing for transitioning the state of the hard disks included in the RAID group to a state where a read request or write request is processible. Also, the spin-down of a RAID group is not required to be the state transition for lowering the rotation speed of the hard disks down to a specified value, as long as the spin-down is a processing for transitioning the state of the hard disks from the after-spin-up higher power-consumption amount state to a lower power-consumption amount state. Hereinafter, in some cases, the state of the hard disks where the read request or write request is processible, or the state of the hard disks where the rotation speed of the platters of the hard disks is raised up to a specified value will be referred to as the spin-up state (or ordinary state). Also, the state of the hard disks where the power consumption is lower than this ordinary state, or the state of the hard disks where the rotation speed of the platters of the hard disks is lowered down to a specified value will be referred to as the spin-down state (or power-saving state).

The plurality of RAID groups (e.g., Rgroup-1, Rgroup-2, and Rgroup-3) are created in the RAID subsystem 1014. The LU (1012) is created on each RAID group. As the LUs (1012) created, there exist the LUs (1012) for storing the user data (which correspond to LU-1 (1012*a*), LU-2 (1012*b*), and LU-3 (1012*c*)), and the LU (1012) for storing the OS program and the management information 1010 (which corresponds to OS-LU (1012*d*)). A FSM (File System Management) file system 1017 is created on the OS-LU (1012*d*). The FSM file system 1017 stores therein the hierarchical management table 4000 (file-system hierarchical management information), the mapping table 6000 (mapping information), the coupling history table 8100, the similar-access user group management table 8200, the non-coupling time-zone management table 8300, and the similar-access file group management table 8400.

The FS1 (1015*a*) is created on the LU-1 (1012*a*). Also, the FS2 (1015*b*) is created on the LU-2 (1012*b*). Moreover, the FS3 (1015*c*) is created on the LU-3 (1012*c*). Data created by the user of each client 1030 is retained by these file systems in the file format. Hereinafter, in some cases, these file systems will be referred to as real file systems. This terminology means "true" file systems which are to be created on the volumes. Namely, this terminology is employed considering the contrast with the "virtual" file system which is to be created in the present invention as will be described later.

The management terminal 1020 is a computer used by a manager that manages the NAS 1001. The manager uses the management command 1005 of the NAS 1001 from the management terminal 1020 via the network. Each client 1030 is a computer which utilizes the file sharing service provided by the NAS 1001. The user, who uses each client 1030, utilizes the file sharing service by the NAS 1001 by way of the file access request program 1031.

Incidentally, the meanings of technical terms which will be used in the following explanation are as follows:

(A) "file": logical entity for storing data generated by each client 1030 or the NAS 1001.

(B) "directory": logical unit for collecting and managing files or directories.

(C) "directory name": name affixed to directory.

(D) "path" or "path name": identification information for identifying file or directory.

(E) "file name": name affixed to file. Additionally, in the following explanation, the path name is included in the file name in some cases.

Figure 2:
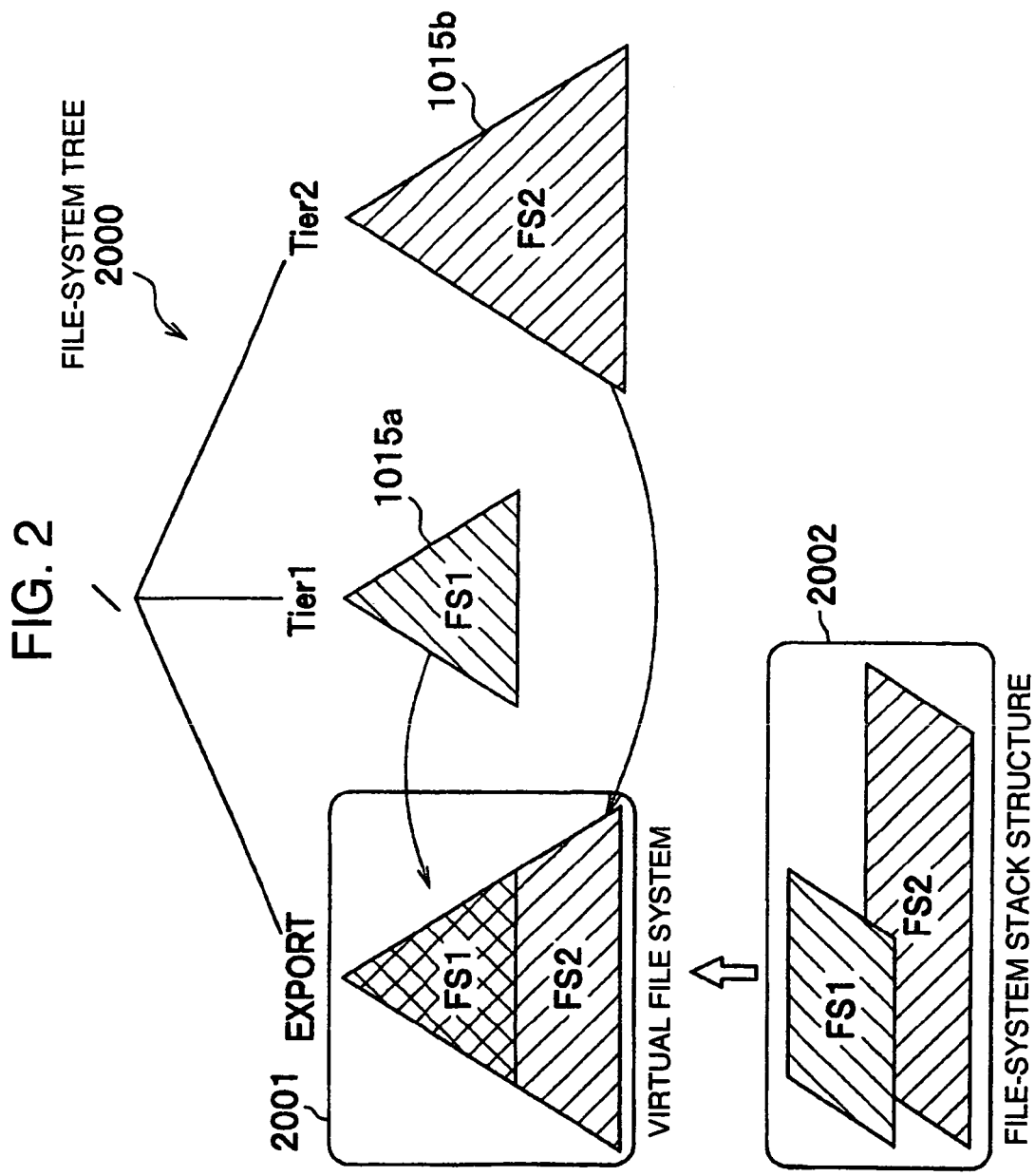
FIG. 2 is a diagram for illustrating a file-system tree structure in a case where the HSM function according to the present embodiment is used.

FIG. 2 is a diagram for illustrating a file-system tree structure in a case where the HSM function according to the present embodiment is used. The file-system tree is a file-system name space which is structured by the NAS 1001 so as to be offered to each client 1030.

The file-system tree 2000 is constituted by "/(root)", and "EXPORT", "Tier1" and "Tier2" under the root. The FS1 (1015*a*) is mounted on the Tier1, and the FS2 (1015*b*) is mounted on the Tier2. The HSM function according to the present embodiment superimposes the Tier1 and the Tier2 on the EXPORT directory. At this time, a virtual file system 2001 is created by deploying the FS1 (1015*a*) and the FS2 (1015*b*) such that, like a file-system stack structure 2002, the FS1 (1015*a*) is positioned over the FS2 (1015*b*).

In the present embodiment, each client 1030 uses the EXPORT directory and the components subsequent thereto. When the user of a client 1030 has created a file, the file is created on the FS1 (1015*a*). Moreover, if usage frequency of the file has lowered, the file is displaced onto the FS2 (1015*b*). The execution of this displacement allows a low usage-frequency file to be displaced from, e.g., a high-speed volume to a low-speed volume. Incidentally, the file whose usage frequency has lowered may be specified by the user of the NAS 1001, or may be specified based on a predetermined rule set in advance into the NAS 1001, or may be specified based on some other method.

When the HSM function constitutes the virtual file system 2001, if same-name files exist in the FS1 (1015*a*) and the FS2 (1015*b*), the file existing in the FS1 (1015*a*) is registered into the virtual file system 2001. As a result, the same-name file existing in the FS2 (1015*b*) is not offered to the client 1030. This is because of the present situation where, as indicated by the file-system stack structure 2002, the FS1 (1015*a*) is deployed such that the FS1 (1015*a*) covers the FS2 (1015*b*). Incidentally, a file-system stack structure is also allowable where the FS2 (1015*b*) is deployed such that the FS2 (1015*b*) covers the FS1 (1015*a*).

Additionally, although, in FIG. 2, the explanation has been given assuming the two-layer constitution, the three-or-more-layer constitution is also allowable. The execution of the method described so far allows the manager to freely integrate the file systems in use.

Here, the detailed explanation will be given below concerning the file systems. The file system (which, hereinafter, will be referred to as "FS" in some cases) is a logical structure which is structured in order to implement the management unit of a file on a volume. Additionally, a logical structure like this may also be, e.g., a table or queue.

FIG. 3 is a diagram for illustrating an example of the structure of the file system. The FS is constituted by including super block (file management information) 301, directory entry (file-name-file-attribute-information correspondence information) 302 (refer to FIG. 4), i-node table (file-attribute-information management information) 303 (refer to FIG. 6), data block (I/O (Input/Output) minimum unit) 304, i.e., block for storing actual files and management data, and the like. Incidentally, the reference relationship between the i node and the data block will be described later referring to FIG. 5.

The super block 301 is an area where information on the FS is retained in batch. As the information to be retained in batch, there exist, e.g., size of the FS, idle capacity of the FS, and the like. The directory entry 302 is an entry for managing the name of each file and the attribute of each file such that a one-to-one correspondence is established therebetween. This directory entry 302 allows one i node (file attribute information) to be made to correspond to one file in the FS.

FIG. 4 is a diagram for illustrating an example of the data structure of the directory entry. As illustrated in FIG. 4, the directory entry 302 is a table where directory path name 401 and i-node number 402, i.e., index for indicating the i node, are combined into a set. The FS makes an access to an i node, using this i-node number in the directory entry. The file system program (e.g., real file system programs 1007) acquires the i-node number from the file name (or directory path name) by making reference to the corresponding i-node entry. Additionally, the directory entry is allowed to exist in a manner of being distributed into the data block.

FIG. 5 is a diagram for illustrating the reference relationship between the i node and the data block. Here, the i node is an area for retaining each-type information (attribute), which includes the i-node number, file's property right, access right, file size, and data's storage position (data-block address (or, pointer)). FIG. 5 implicitly shows a manner in which reference is made to the hatched-part blocks (which indicate the data's storage positions) inside the data blocks within the range of the access right. Here, this reference is made in such a manner as to follow the information registered into the i-node table 303, which will be described later. In FIG. 5, u, g, o, r, x, and w indicate abbreviations for user, group, other (other than user), read, execute, and write, respectively.

Figure 6:
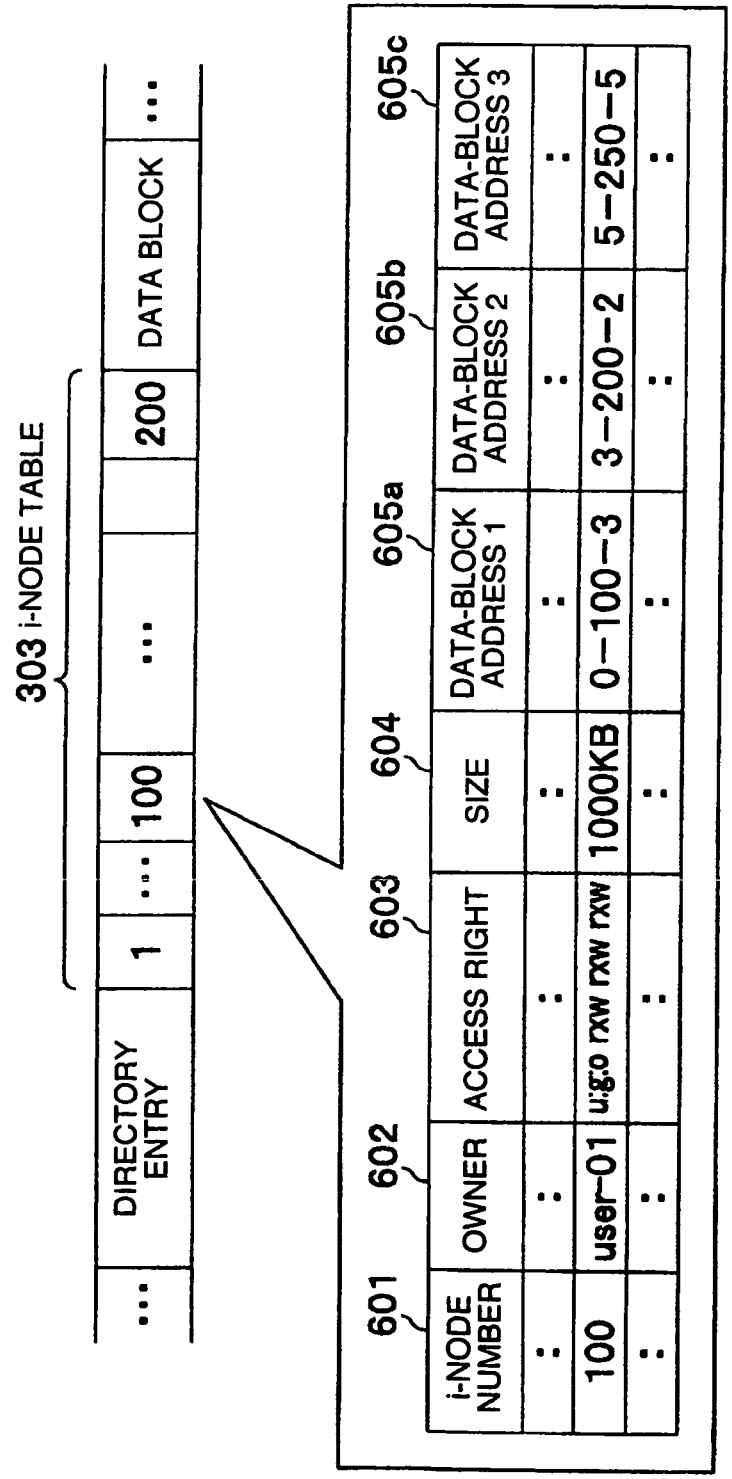
FIG. 6 is a diagram for illustrating an example of the data structure of the i-node table.

FIG. 6 is a diagram for illustrating an example of the data structure of the i-node table. The i-node table 303 is a table for storing the i node. As illustrated in FIG. 6, the i-node table 303 is the table where the i-node number 601, owner 602, access right 603, size 604, and data-block addresses 1, 2, 3 . . . (605a, 605b, 605c . . . ) are combined into a set.

Figures 7, 8, 9:
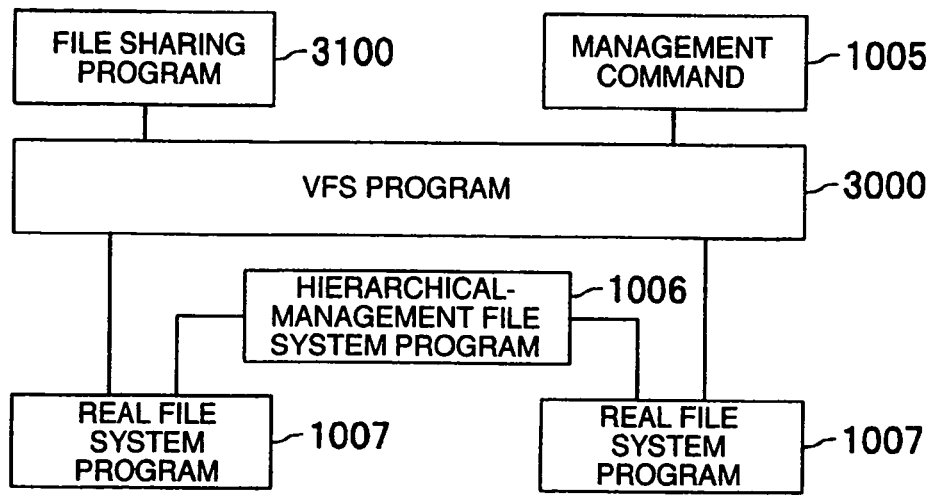
FIG. 7 is a diagram for illustrating software constitution of the NAS.
FIG. 8 is a diagram for illustrating a hierarchical management table, which is management information on the hierarchy of the file system.
FIG. 9 is a diagram for illustrating the fundamental data structure of a hierarchical data list.

FIG. 7 is a diagram for illustrating software constitution of the NAS. The software constitution of the NAS 1001 is constituted by the file sharing program 3100, the management command 1005, the VFS program 3000, the hierarchical-management file system program 1006, and the real file system programs 1007.

The management command 1005 and the file sharing program 3100, which has received a file access request from the client 1030, request the access to the VFS program 3000, i.e., a partial component of the operating system 1009. The VFS program 3000 is a program which has a function of virtualizing access interfaces of the real file system programs 1007 and the hierarchical-management file system program 1006, and providing the virtualized access interfaces to the management command 1005 and the file sharing program 3100.

The hierarchical-management file system program 1006 receives the access request from the file sharing program 3100 and the management command 1005 via the VFS program 3000. Also, the hierarchical-management file system program 1006 requests the access to the real file system programs 1007 (e.g., the FS1 (1015a) and the FS2 (1015b)). Meanwhile, in some cases, the real file system programs 1007 receives the access request directly from the VFS program 3000. In this way, the VFS program 3000 is the software which constitutes the operating system for performing an intermediary service between the file sharing program 3100 and the file system programs (i.e., the hierarchical-management file system program 1006 and the real file system programs 1007).

Incidentally, the file sharing program 3100 and the management command 1005 operating in the NAS 1001 are also allowed to operate as partial components of a kernel. Otherwise, there are also allowed to operate as general programs which are different from the kernel, and which form a more-protected executing environment. Here, the kernel is software for carrying out the overall control over the NAS 1001 by exercising, e.g., the scheduling control over a plurality of programs (processes) operating on the kernel, and the handling of an interrupt from hardware. Namely, the kernel implements the basic functions of the OS (Operating System).

Types of the request (i.e., file access request) that the file sharing program 3100 receives from the client 1030 are as follows, for example: Incidentally, commands in the NFS (Network File System) and the CIFS (Common Internet File System) are exemplified in the following example. However, a command other than these commands may also be included, or may also be used as their alternatives.

(A) A lookup request for acquiring an identifier (which, hereinafter, will be referred to as "file handle identifier") which is needed for making reference to and making operation for files or directories in the following (B) to (H) from path names of the files or directories. In the case of the NFS protocol, there exists, e.g., a Lookup command for specifying a path name. When the lookup request is made, the hierarchical-management file system program 1006 executes the Lookup processing.

(B) A create request for creating a file in a specified directory with a specified file name. In the case of the NFS protocol, there exist, e.g., the file handle identifier for a directory acquired by the lookup request, and a Create command where the file name is set as the argument. In the case of the CIFS protocol, there exists, e.g., a SMB_COM_CREATE command where the directory name and file name are set as the argument. When the create request is made, the hierarchical-management file system program 1006 executes the Create processing.

(C) A mkdir request for creating a novel directory under a specified directory (directory name of the novel directory is also specified). In the case of the NFS protocol, there exist, e.g., the file handle identifier for a directory acquired by the lookup request, and a Mkdir command where the name of the novel directory is set as the argument. In the case of the CIFS protocol, there exists, e.g., a SMB_COM_CREATE_DIRECTORY command where the directory name and novel directory name are set as the argument. When the mkdir request is made, the hierarchical-management file system program 1006 executes the Mkdir processing.

(D) A readdir request for transmitting, to the client 1030, file names or directory names of one or more files or directories existing under a specified directory. In the case of the NFS protocol, there exist, e.g., a Readdir command where the file handle identifier for a directory acquired by the lookup request is set as the argument. In the case of the CIFS protocol, there exists, e.g., a SMB_COM_TRANSACTION2: TRANS2_QUERY_PATH_INFORMAYTION command where the directory name is set as the argument. When the readdir request is made, the hierarchical-management file system program 1006 executes the Readdir processing.

(E) An open request for requesting the NAS 1001 to make a preparation processing for reading or writing a specified file. In the case of the NFS protocol, there exists, e.g., an Open command where the file handle identifier for a file acquired by the lookup request is set as the argument. In the case of the CIFS protocol, there exists, e.g., a SMB_COM_OPEN command where the (path-name-included) file name is set as the argument. Incidentally, in the case of the CIFS protocol, an identifier (which, hereinafter, will be referred to as "open identifier") for performing a file read or write processing is transmitted to the client 1030 as response information to the SMB_COM_OPEN command.

(F) A read request for reading data of the file prepared by the open request. In the case of the NFS protocol, there exists, e.g., a Read command where the file handle identifier for a file acquired by the lookup request is set as the argument. In the case of the CIFS protocol, there exists, e.g., a SMB_COM_READ command where the open identifier is set as the argument.

(G) A write request for writing data of the file prepared by the open request. In the case of the NFS protocol, there exists, e.g., a Write command where the file handle identifier for a file acquired by the lookup request is set as the argument. In the case of the CIFS protocol, there exists, e.g., a SMB_COM_WRITE command where the open identifier is set as the argument.

(H) A close request for terminating the preparation made by the open request. In the case of the NFS protocol, there exists, e.g., a Close command where the file handle identifier for a file acquired by the lookup request is set as the argument.

In the case of the CIFS protocol, there exists, e.g., a SMB_COM_CLOSE command where the open identifier is set as the argument.

Additionally, when a directory or file is specified to each request, each request has been accompanied by the directory name or file name as the argument. In addition to this specifying information, whatever specifying-format information is available as long as the NAS 1001 can receive information which allows the NAS 1001 to specify the directory or file.

Also, of files managed by the NAS 1001 in a manner of being stored into the volumes, there exists a file which is to be used by the NAS 1001 itself, or whose reading or writing is wished to be permitted only to a certain specific client from among the plurality of clients 1030 for security reason. In order to address the requests like this, the file sharing program 3100 of the NAS 1001 possesses a function referred to as "export". The export function is the function whereby directories or files (i.e., directory space in other expression) under a predetermined directory (hereinafter, referred to as "export directory") defined in a file system on a logical volume are provided only to a predetermined client 1030 (i.e., export-destination client) by the NAS 1001. In this case, the directory space is transformed so that the directories or files under the above-described predetermined directory will exist in the top directory with respect to the above-described predetermined client 1030.

For example, assume a case where the NAS 1001 manages a "work" directory under which a "homework.txt" file exists, and a "/home/user1" directory under which a "diary.txt" file exists. In this case, if the "/home/user1" directory is specified as the export directory, and if a client having the name of foo is specified from among a plurality of clients, when seen from the foo client, it looks as if the "work" directory and the "diary.txt" file existed directly under the root directory of the directory space provided by the server.

FIG. 8 is a diagram for illustrating the hierarchical management table, which is management information on the hierarchy of a file system. The hierarchical management table 4000 is part of the management information 1010. When the manager generates the virtual file system using the management command 1005, the hierarchical-management file system program 1006 creates the hierarchical management table 4000, i.e., the information for managing the mutual correspondence between the "virtual" file system and the "real" file systems. The hierarchical management table 4000 is constituted by one record, which includes mount path 4001 for indicating mount position of a file system (e.g., the FS1 (1015*a*) or the FS2 (1015*b*)), FSID 4002, i.e., management ID (Identifier) of the file system, and hierarchy 4003 for indicating the hierarchy of the file system.

The hierarchical-management file system program 1006 records path information, based on which a file system is to be mounted, into the mount path 4001 with the use of a complete path name. The complete path name, which is a path starting with "/(root)", refers to "/EXPORT" as is illustrated in FIG. 8 for example.

Also, the FSID (4002) records a value which the manager has set up when the manager mounts a real file system. The values set by the manager will be used in the following FSID.

Also, the hierarchical-management file system program 1006 uses a certain specific value of the hierarchy 4003 in a usage other than the hierarchy. For example, when the hierarchy 4003 is set up at 0x00, the management command 1005 and the hierarchical-management file system program 1006 recognizes its hierarchy as being the virtual file system 2001 (refer to FIG. 2).

Moreover, the management command 1005 does not start the hierarchy 4003 from 0x01 (i.e., 1 in decimal system), but employs the numbers every two numbers from 0x0F (i.e., 16 in decimal system). This number-employment system makes it easier to further add a hierarchy to the highest-order hierarchy, and also to add a hierarchy into between hierarchies. This number-employment system, however, is merely one example. Namely, the number-employment method is not limited specifically by the present embodiment.

Figure 10:
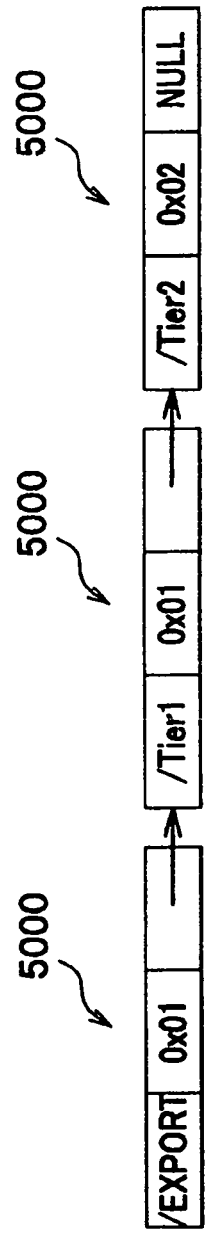
FIG. 10 is a diagram for illustrating the data structure of the hierarchical data list based on the fundamental data structure, where the real file systems which constitute the virtual file system in use are managed as a list.

FIG. 9 is a diagram for illustrating the fundamental data structure of a hierarchical data list. FIG. 10 is a diagram for illustrating the data structure of the hierarchical data list based on the fundamental data structure, where the real file systems which constitute the virtual file system in use are managed as a list. The hierarchical data list 5000 is part of the management information 1010. As illustrated in FIG. 9, the fundamental data structure of the hierarchical data list 5000 is constituted by mount path 5001 for indicating a path in being mounted, FSID 5002 for indicating ID of a file system, and pointer 5003. Additionally, the hierarchical management table 4000 illustrated in FIG. 8 is a table of permanent property. In contrast thereto, the hierarchical data list 5000 illustrated in FIG. 9 and FIG. 10 differs therefrom in a point that the hierarchical data list 5000 is a table of temporary property, i.e., under-management (in-operation) property.

Concretely, the hierarchical data list 5000 illustrated in FIG. 10 indicates a hierarchical structure where the virtual file system 2001 ("/EXPORT") is positioned at its front head. For example, if "/Tier1" is removed (i.e., is withdrawn from the hierarchical management) by an instruction of the manager, the hierarchical management table 4000 is not changed, but the hierarchical data list 5000 is changed. The hierarchical-management file system program 1006 rewrites the pointer of "/EXPORT" out of the hierarchical data list 5000, thereby changing the pointer so that the pointer will point at "/Tier2". Furthermore, the program 1006 disposes the data on "/Tier1". The execution of the processing like this permits the hierarchical-management file system program 1006 to manage the permanent hierarchical-constitution information and the temporary hierarchical-constitution information with a high efficiency.

Next, the explanation will be given below concerning the management command 1005.

(Participation Command into Hierarchical Management)

The following Expression (A1) and Expression (B1) indicate an example of the command which the manager inputs when integrating the real file systems into the virtual file system 2001 (i.e., when causing the real file systems to participate into the hierarchical management). The Expression (A1) is the format for the mount command, and the Expression (B1) indicates its concrete example.

mount–*t hmfs*–*o T*=<Tier>,
  *D*=<TARGET><SRC><SRC>     (A1)

mount–*t hmfs*–*o T*=1,*D*=/EXPORT/Tier1/Tier1     (B1)

Taking advantage of a terminal program of the management terminal 1020, the manager establishes a coupling to the file sharing program 3100 of the NAS 1001, thereby logging-in to the NAS 1001. Moreover, the manager executes the management command 1005 in order to cause the real file systems to participate into the hierarchical management.

In the Expression (A1), based on the "–t" option of the mount command, the manager specifies utilization of the hierarchical-management file system program 1006. Moreover, based on the "–o" option, the manager specifies options of the hierarchical-management file system program 1006.

Of the options of the hierarchical-management file system program 1006, options to be used in the participation processing into the hierarchical management are "T" and "D". The T option indicates the hierarchy of a real file system, and the D option indicates the path of the virtual file system 2001. Furthermore, the path of the file system on which the real file system is mounted is specified into <SRC>. Concretely, when the FS A (1015) is caused to participate into the hierarchical management (refer to FIG. 2), "/Tier1" is specified as is shown in the Expression (B1).

In this way, when the participation command into the hierarchical management is inputted, the hierarchical-management file system program 1006 executes the hierarchical-management participation processing.

(Management-Information Restructure Command)

The following Expression (A2) and Expression (B2) indicate an example of the command for restructuring the mapping table 6000 when the mapping table 6000 is collapsed. The Expression (A2) is the format for the mount command used for the restructure of the management information, and the Expression (B2) indicates its concrete example.

$$\text{mount}-t\ hmfs-o\ I=<\text{Tier }DB>,D=<\text{TARGET}>hmfs\ hmfs \qquad (A2)$$

$$\text{mount}-t\ hmfs-o\ I=/\text{HMDB},D=/\text{EXPORT}\ hmfs\ hmfs \qquad (B2)$$

Taking advantage of the terminal program of the management terminal 1020, the manager establishes the coupling to the file sharing program 3100 of the NAS 1001, thereby logging-in to the NAS 1001. Moreover, the manager executes the management command 1005 in order to cause the real file systems to participate into the hierarchical management.

In the Expression (A2), as is the case with the participation processing into the hierarchical management, the –t option indicates the utilization of the hierarchical-management file system program 1006. In the restructure of the management information, however, the options of the hierarchical-management file system program 1006 to be specified by the –o option differ from the ones in the participation processing. Namely, the manager specifies the file-system path in which the mapping table 6000 is stored into the I option. Also, the manager specifies the path of the virtual file system 2001 into the D option. Selecting FIG. 2 as an example, concretely, the manager instructs the hierarchical-management file system program 1006 to restructure a HMDB file which is stored into /, as is shown in the Expression (B2). In this way, when the management-information restructure command is inputted, the hierarchical-management file system program 1006 executes the management-information restructure processing.

(Withdrawal Command from Hierarchical Management)

The following Expression (A3) and Expression (B3) indicate an example of the command which the manager inputs when removing a file system specified by the manager from the hierarchical management. The Expression (A3) is the format for the removal processing from the hierarchical management (i.e., withdrawal processing from the hierarchical management), and the Expression (B3) indicates its concrete example.

$$\text{umount}<SRC> \qquad (A3)$$

$$\text{umount}/\text{Tier1} \qquad (B3)$$

Taking advantage of the terminal program of the management terminal 1020, the manager establishes the coupling to the file sharing program 3100 of the NAS 1001, thereby logging-in to the NAS 1001. Moreover, the manager executes the management command 1005 in order to manage the real file system under the hierarchical management.

The use of the umount command allows the manager to remove the file system from the hierarchical management. In the Expression (A3), the file-system path on which the real file system is mounted is specified into the umount command. Selecting FIG. 2 as an example, concretely, the manager instructs the hierarchical-management file system program 1006 to remove the file system mounted on /Tier1 from the hierarchical management, as is shown in the Expression (B3). In this way, when the withdrawal command from the hierarchical management is inputted, the hierarchical-management file system program 1006 executes the hierarchical-management withdrawal processing.

(Displacement Command for Hierarchy)

The following Expression (A4) and Expression (B4) indicate an example of the command which the manager or the user using the client 1030 inputs when displacing the hierarchy of a file. The Expression (A4) is the format for the hierarchy displacement processing, and the Expression (B4) indicates its concrete example.

$$mv\_\text{tier}-t2<\text{FILE}> \qquad (A4)$$

$$mv\_\text{tier}-t2\text{FILE1} \qquad (B4)$$

Taking advantage of the terminal program of the management terminal 1020, the manager establishes the coupling to the file sharing program 3100 of the NAS 1001, thereby logging-in to the NAS 1001. Moreover, the manager executes the management command 1005 in order to cause the real file system to participate into the hierarchical management.

In the Expression (A4), the –t option specifies the hierarchy of a displacement destination. Concretely, as is shown in the Expression (B4), the execution of the present command causes FILE1, which is stored into /Tier1, to displace to /Tier2. In this way, when the hierarchy displacement command is inputted, the hierarchical-management file system program 1006 executes the hierarchy displacement processing.

Figure 11:
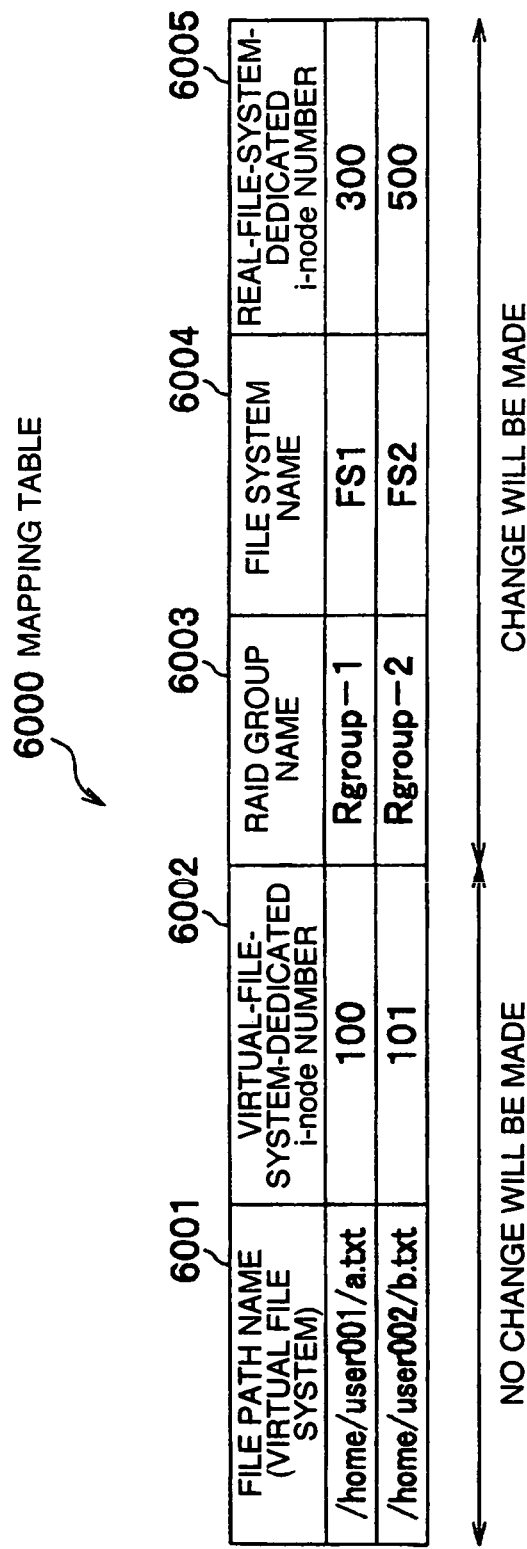
FIG. 11 is a diagram for illustrating the data structure of the mapping table.

FIG. 11 is a diagram for illustrating the data structure of the mapping table. The mapping table 6000, which is part of the management information 1010, performs the mapping between a virtual file system and a real file system thereby to indicate the real-file-system information in which a file is stored. The mapping table 6000 is constituted by the following components: File path name 6001 for indicating the file name of a virtual file system as the file path, virtual-file-system-dedicated i-node number 6002 (i.e., first file-attribute identification information) for indicating the i-node number of the virtual file system, RAID group name 6003 for indicating the RAID group in which the file is stored, file system name 6004 (the same meaning as the FSID (4002) in FIG. 8) for indicating the real file system which manages the file, and real-file-system-dedicated i-node number 6005 (i.e., second file-attribute identification information) for indicating the i-node number of the real file system.

The mapping table 6000 establishes a one-to-one correspondence between one record and one file. The VFS program 3000 records the complete file path of the virtual file system 2001 into the file path name 6001. The file name to be recorded into the file path name 6001 is the same as the file path name retained by a file system that is to make the hierarchical management (, which refers to a real file system, and means, e.g., the FS1 (1015a) or the FS2 (1015b) in the case in FIG. 2). For example, if a file of "/home/user001/a.txt" exists in the FS1 (1015a) in FIG. 2, the VFS program 3000 records "/home/user001/a.txt" into the file path name 6001. Meanwhile, if a file of "/home/user002/b.txt" exists therein, the VFS program 3000 records "/home/user002/b.txt" into the file path name 6001.

The user who uses the client 1030 makes an access to a file by specifying the file path name 6001. At this time, when seen from the user, it looks as if the access were made to the virtual file system. Actually, however, the VFS program 3000 (or hierarchical-management file system program 1006) identifies a record corresponding to the file path name 6001, thereby switching the access to an access to the real file system programs 1007. Moreover, the real file system programs 1007 implement the access to the file existing on the corresponding real file system. Incidentally, in the present embodiment, even if the mapping table 6000 has been lost, the management-information restructure processing makes it possible to restructure the mapping table 6000 lost. As a result, it becomes possible to implement the high availability.

Additionally, if a file transfer has been performed between the volumes whose RAID groups are different from each other, in the mapping table 6000, the values registered into the RAID group name 6003, the file system name 6004, and the real-file-system-dedicated i-node number 6005 are changed, of course. This change in the volumes, however, will not emerge and appear in the virtual file system. Accordingly, the values registered into the file path name 6001 and the virtual-file-system-dedicated i-node number 6002 are not changed.

FIG. 12 is a diagram for illustrating the data structure of the coupling history table. The coupling history table 8100, which is part of the management information 1010, is a table for managing the time-and-date of a coupling/decoupling (i.e., log-in/log-out) from each user to/from the NAS 1001. The coupling history table 8100 is constituted by including the time-and-date 8101 including point-in-time, user name 8102 of each user who had made an access using the client 1030, and occurrence event 8103. Concretely, as illustrated in FIG. 12, the table 8100 shows that the user of user001 had made the coupling request to the NAS 1001 at 11:00:05 on Jan. 5, 2008 (2008/01/05 11:00:05). Similarly, the table 8100 shows that the user of user001 had made the decoupling request to the NAS 1001 at 11:15:00 on Jan. 5, 2008 (2008/01/05 11:15:00). The table 8100 also shows that the NAS 1001 executes a forceful decoupling (i.e., time-out) when a predetermined time has elapsed.

FIG. 13 is a diagram for illustrating the data structure of the similar-access user group management table. The similar-access user group management table 8200, which is part of the management information 1010, is a management table for managing the users-grouped information on the basis of each similar coupling time-zone from the coupling history table 8100. The similar-access user group management table 8200 is constituted by including group name 8201 and user name 8202. Concretely, as illustrated in FIG. 13, the table 8200 shows that the users of user001 and user002 are included in the Group A.

FIG. 14 is a diagram for illustrating the data structure of the non-coupling time-zone management table. The non-coupling time-zone management table 8300, which is part of the management information 1010, is a management table for managing the information in which the one-to-one correspondence is established between the group name 8201 of the similar-access user group management table 8200 and the non-coupling time-zone during which each user in the group name does not establish the coupling to the NAS 1001. The non-coupling time-zone management table 8300 is constituted by including the group name 8301 and the non-coupling time-zone 8302. Concretely, the table 8300 shows that, when the group name is the Group A, the non-coupling time-zone is a time-period from 9:00 to 11:00, and the non-coupling time-zone is a time-period from 17:00 to 22:00. Also, the table 8300 shows that, when the group name is the Group B, the non-coupling time-zone is a time-period from 15:00 to 17:00, and the non-coupling time-zone is a time-period from 18:00 to 22:00.

FIG. 15 is a diagram for illustrating the data structure of the similar-access file group management table. The similar-access file group management table 8400, which is part of the management information 1010, is a management table for managing the information in which the one-to-one correspondence is established between the group name 8201 of the similar-access user group management table 8200 and the file accessed by the similar-access user group in the group name 8201. The similar-access file group management table 8400 is constituted by including the group name 8401 and file name 8402. Concretely, the table 8400 shows that, when the group name is the Group A, the file names are /home/share/a.txt, /home/share/b.txt, and the like.

Next, referring to FIG. 16 to FIG. 21, the explanation will be given below concerning the processing outlines which will be performed in the present embodiment.

As having been exactly explained already, in the RAID subsystem 1014, the one or more file systems (such as the FS1 (1015a) and FS2 (1015b)) created from the one or more LUs (1012) are subjected to the one-dimensional management by the NAS 1001. The file sharing program 3100 of the NAS 1001 structures the virtual file system via the hierarchical-management file system program 1006. Here, the virtual file system is a system which is acquired by virtually integrating the one or more file systems.

(Access Processing of File Sharing Program)

Figure 16:
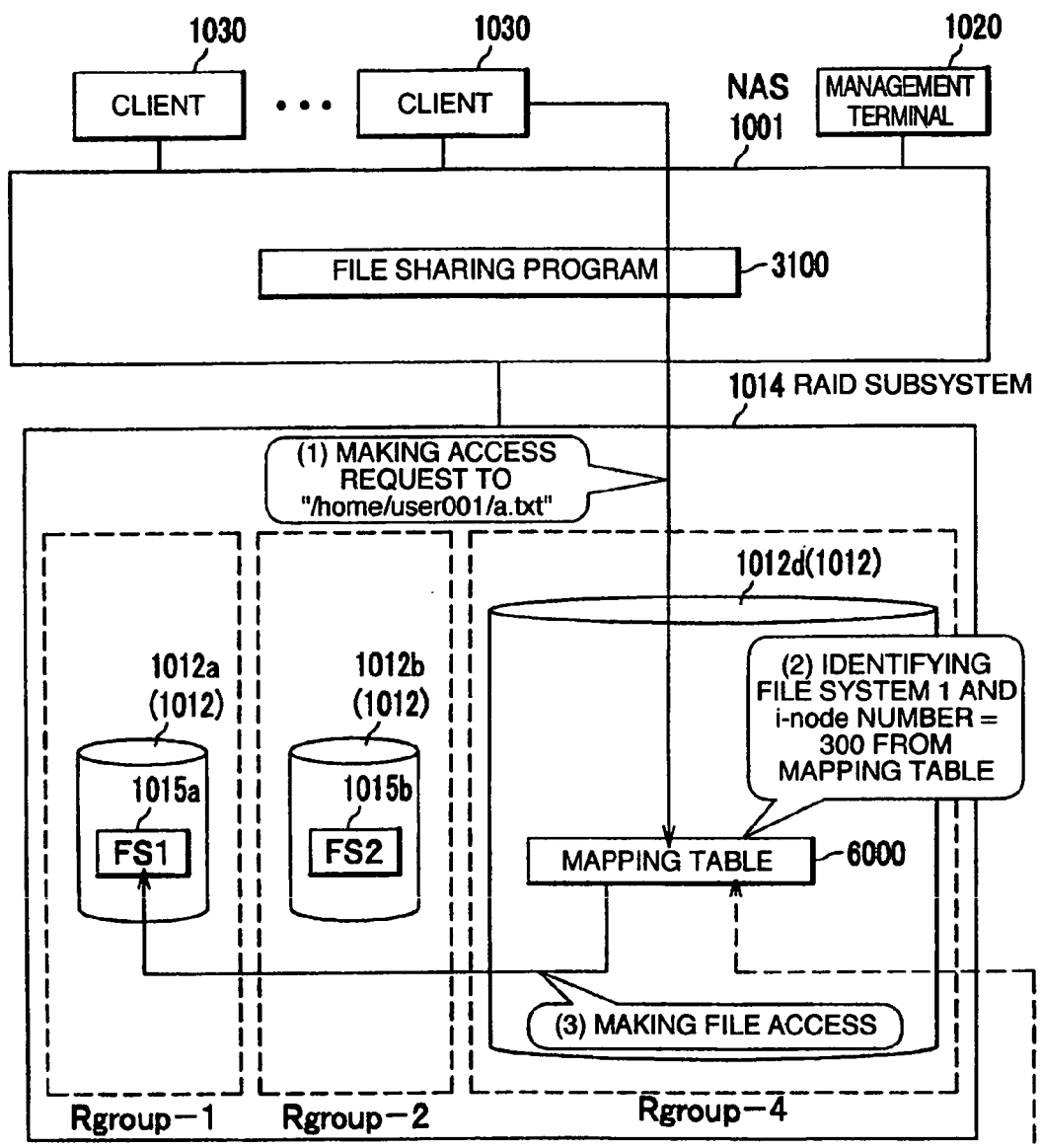
FIG. 16 is a diagram for illustrating processing steps to the real file systems in the case where a file access is made from a client.

FIG. 16 is a diagram for illustrating processing steps to the real file systems in the case where a file access is made from a client. For convenience of explanation, the drawing in FIG. 1 is simplified, and the Rgroup-3 is omitted. The client 1030 is not permitted to see the individual file systems existing in each RAID group, but is permitted to see the virtual file system.

The client 1030 makes an access request to a file of "/home/user001/a.txt" (refer to (1) in the diagram). Then, the NAS 1001 identifies the FS1 (1015a) and the real-file-system-dedicated i-node number=300, using the file name of "/home/user001/a.txt" as the retrieval key (refer to (2) in the diagram). This identification is performed via the file sharing program 3100, and from the mapping table 6000 existing in the RAID subsystem 1014. Moreover, the NAS 1001 makes a file access to the identified file system (i.e., the FS1 (1015a)), then executing the access processing in the file unit (e.g., Read processing or Write processing).

(Processing Outline of File Sharing Program)

Figure 17:
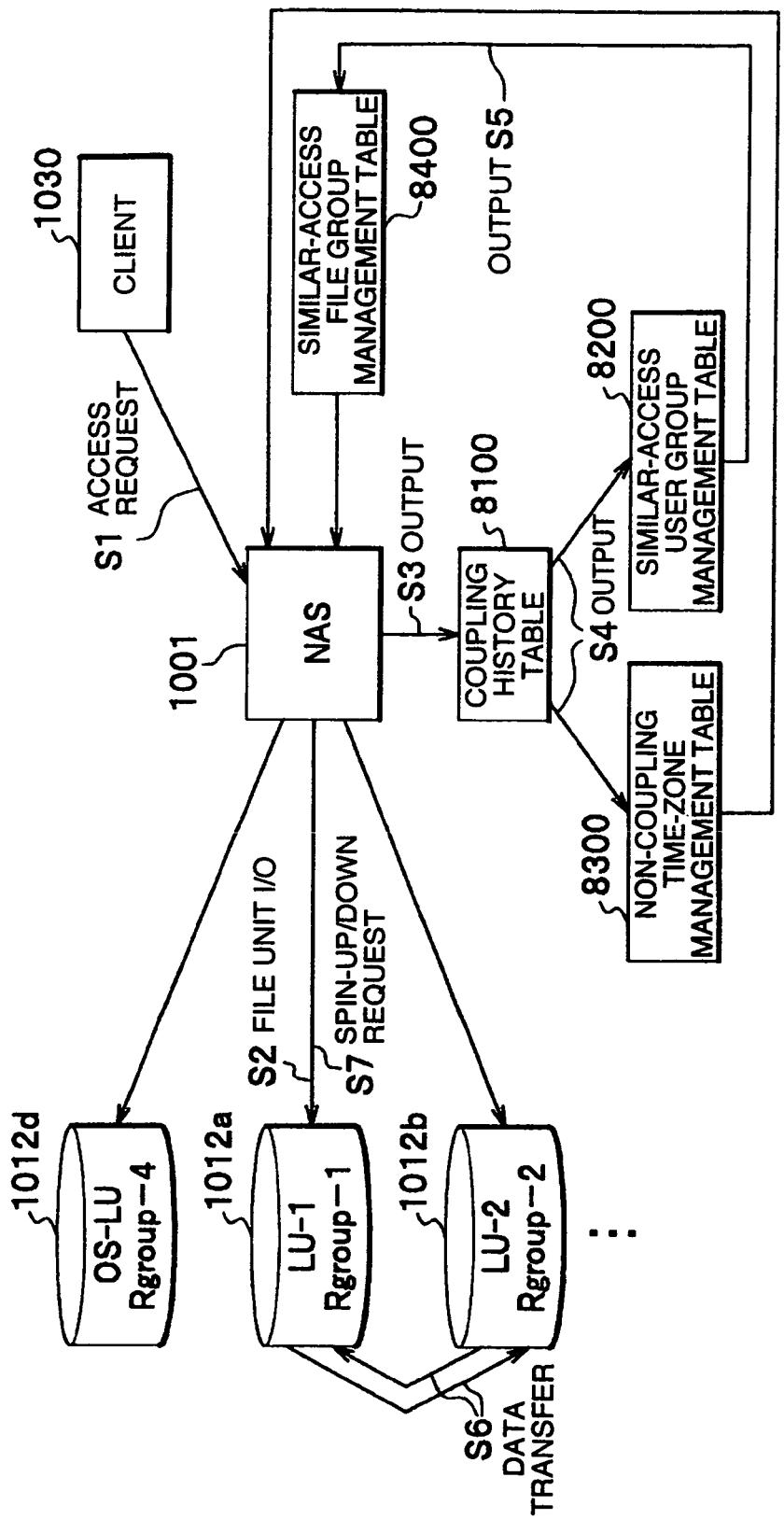
FIG. 17 is a diagram for illustrating the processing outline of the file sharing program according to the first embodiment.

FIG. 17 is a diagram for illustrating the processing outline of the file sharing program according to the first embodiment. The processing outline of the file sharing program 3100 is constituted by including the following steps:

step S1: access request
step S2: execution of file unit I/O
step S3: output to coupling history table 8100
step S4: output to similar-access user group management table 8200 and non-coupling time-zone management table 8300
step S5: output to similar-access file group management table 8400
step S6: data transfer of target file
step S7: spin-up/down request to RAID groups Hereinafter, referring to FIG. 18 to FIG. 21, the explanation will be given below concerning the above-described respective steps.

(From Step S1 to Step S3)

Figure 18:
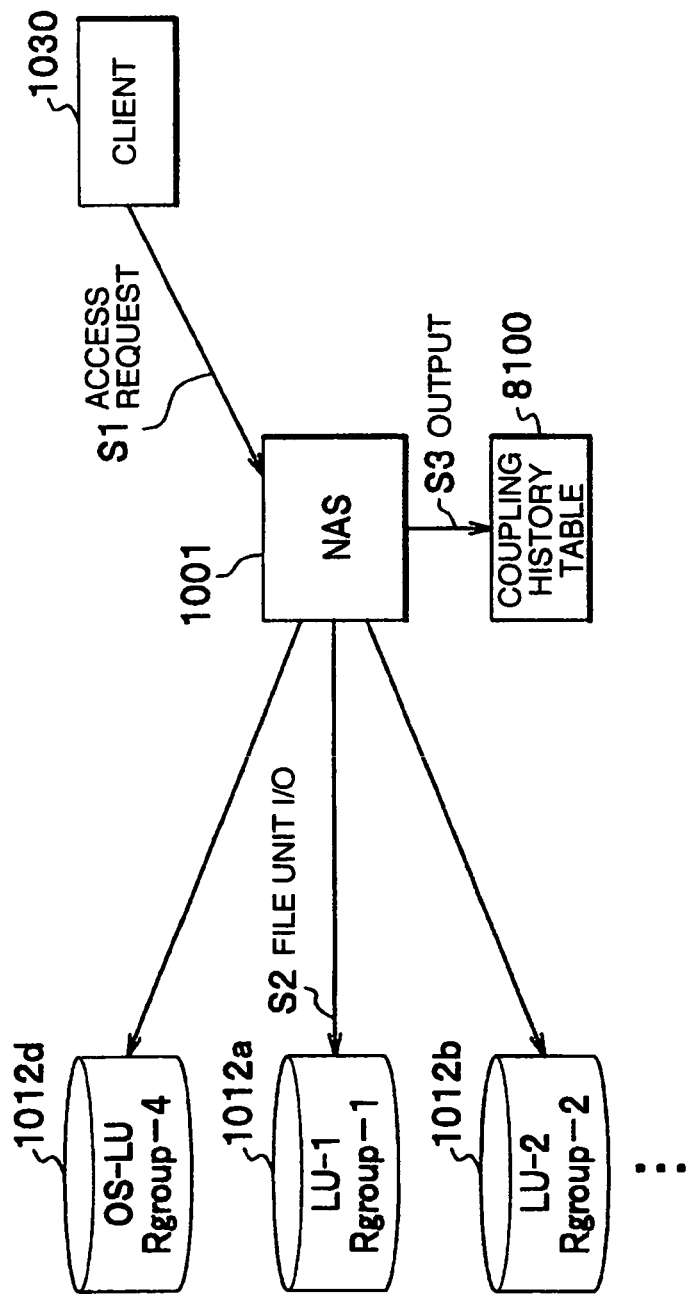
FIG. 18 is a diagram for illustrating the processing in the case where an access is made from a client.

FIG. 18 is a diagram for illustrating the processing in the case where an access is made from a client. When the NAS 1001 receives an access request from the user of a client 1030 that had established the coupling (step S1), the NAS 1001 makes reference to the mapping table 6000 within the OS-LU (1012d), then executing the file unit I/O (step S2). At the time of the log-in/log-out of the user, the NAS 1001 records (outputs), into the coupling history table 8100, the user name and a point-in-time at which the client 1030 had established the coupling to the NAS 1001 (step S3). Additionally, it is preferable that the processing be performed in a certain constant time so as to accumulate the coupling history into the coupling history table 8100.

(Step S4)

Figure 19:
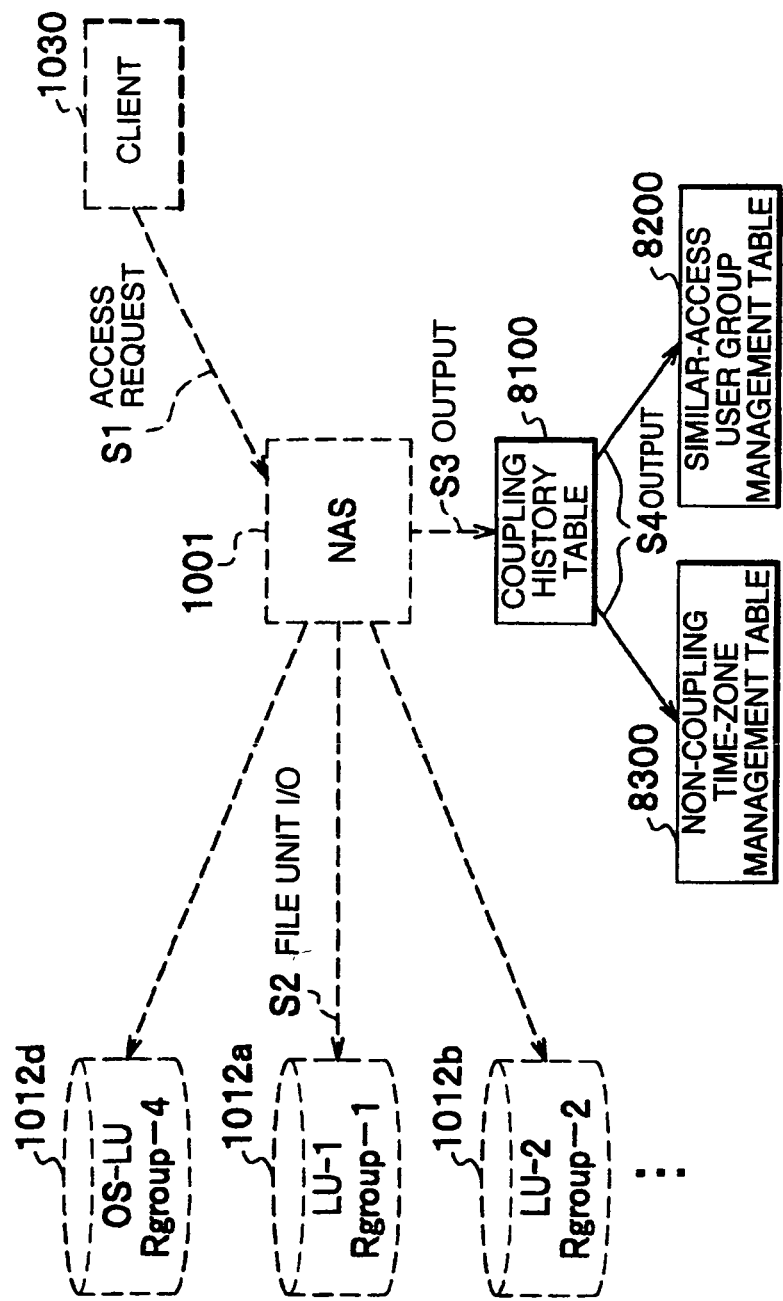
FIG. 19 is a diagram for illustrating the processing for applying the grouping to users, and establishing the mutual relationship between each group and the non-coupling time-zone.

FIG. 19 is a diagram for illustrating the processing for applying the grouping to users, and establishing the mutual relationship between each group and the non-coupling time-zone. The NAS 1001 makes reference to the coupling history table 8100, then applying the grouping to the users (each resultant group will be referred to as "similar-access user group") on the basis of each similar non-coupling time-zone. Then, the NAS 1001 outputs the users-grouped result to the similar-access user group management table 8200. Also, the NAS 1001 establishes the mutual relationship between each grouped group and the non-coupling time-zone, then outputting the relationship-established result to the non-coupling time-zone management table 8300. Additionally, the application of the grouping to the users will be explained below, referring to FIG. 22.

Figure 22:
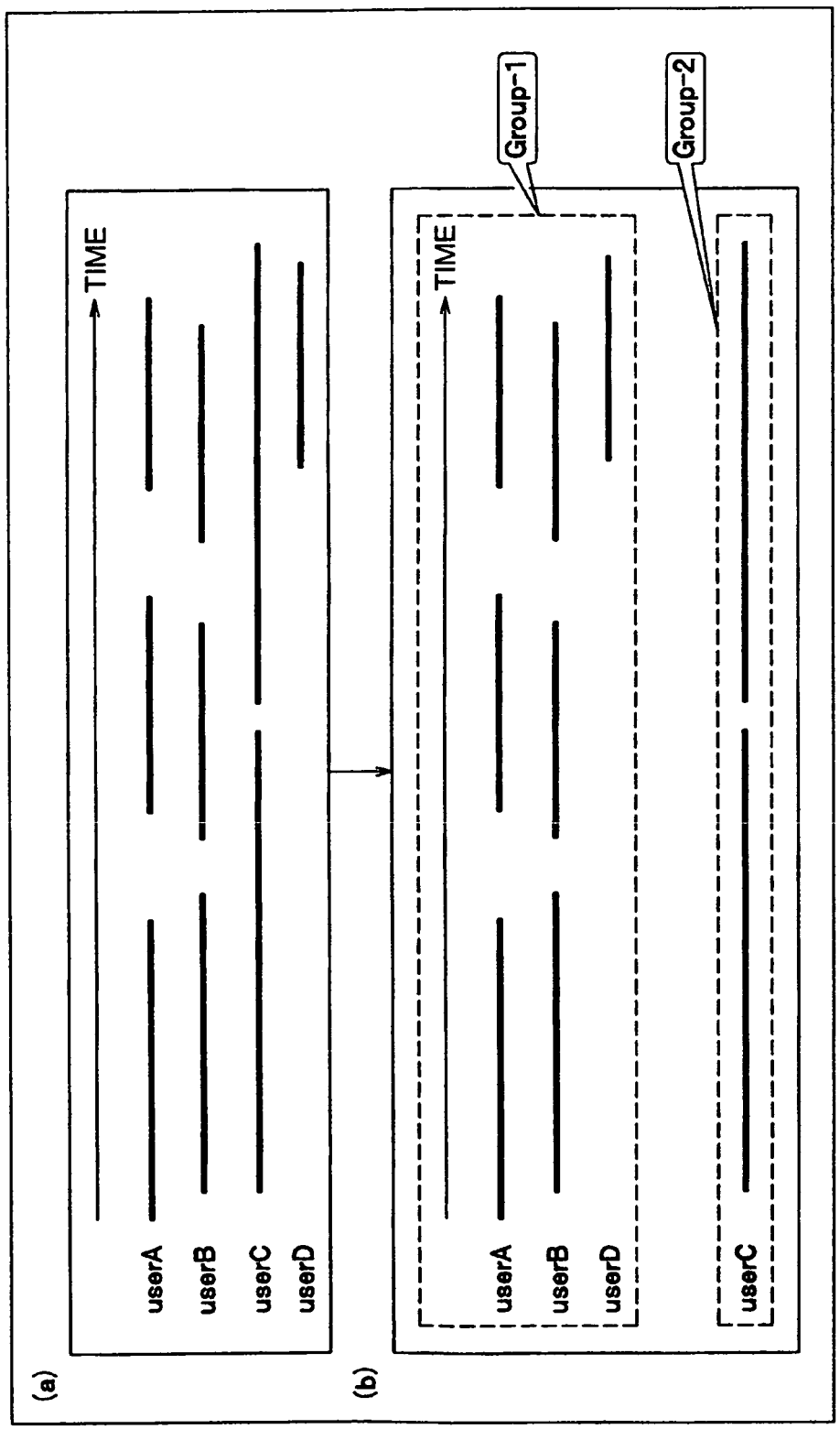
FIG. 22 is a diagram for illustrating the processing for applying the grouping to users on the basis of similar coupling time-zones.

FIG. 22 is a diagram for illustrating the processing for applying the grouping to the users on the basis of each similar coupling time-zone. The (a) part in FIG. 22 illustrates the coupling time-zone for each user, which is based on the coupling history table 8100. The transverse axis denotes time, and the coupling time-zone for each user is illustrated using the bold line. The (b) part in FIG. 22 illustrates an example which is obtained after the processing for applying the grouping to the users on the basis of each similar coupling time-zone. What is referred to as "similar coupling time-zones" here mean the coupling time-zones which coincide with each other, or coincide with each other partially. Concretely, the coupling time-zones of the user A, the user B, and the user D coincide with each other substantially. What is more, these users include the non-coupling time-zones during which there is a possibility of applying the spin-down to the RAID groups. Accordingly, these users are grouped into the Group-1. Even if, however, the user C is tried to be grouped into the Group-1 together with, e.g., the user A, each of users can not find non-coupling time-zones therebetween. Consequently, the user C cannot be grouped into the Group-1, and thus is grouped into the Group-2. Incidentally, in the application of a grouping to files, a time needed for the spin-down or spin-up itself is required to be taken into consideration.

Figure 23:
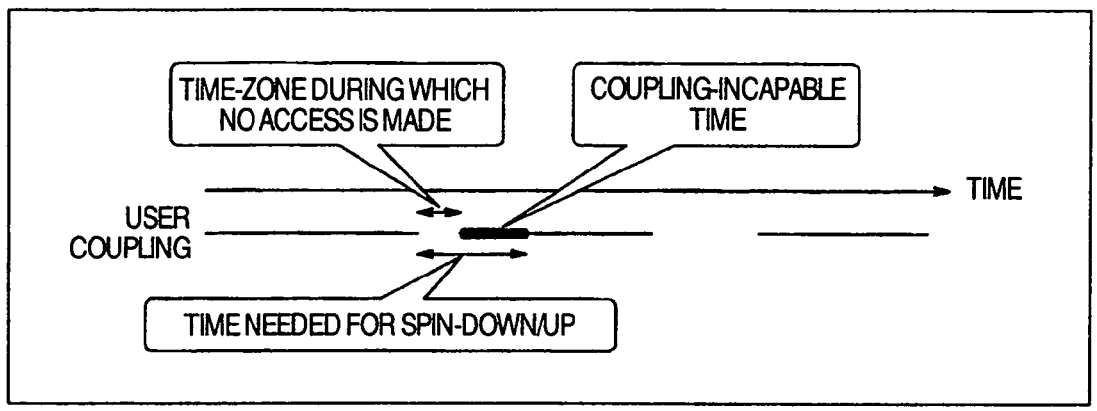
FIG. 23 is a diagram for illustrating a manner of a file access where a time needed for the spin-down or spin-up itself is taken into consideration.
Figure 24:
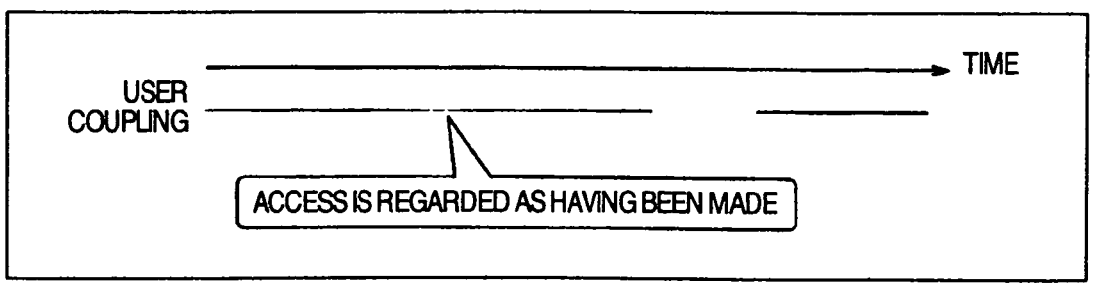
FIG. 24 is a diagram for illustrating the manner of the file access where the time needed for the spin-down or spin-up itself is taken into consideration.

FIG. 23 and FIG. 24 are diagrams for illustrating a manner of a file access where a time needed for the spin-down or spin-up itself is taken into consideration. When classifying the users on the basis of each time-zone during which each user makes an access, attention should be paid to the time needed for the spin-down or spin-up and a halt time-zone obtained. As illustrated in FIG. 23, if the time-interval of the time-zone during which no access (i.e., coupling) is made is shorter than the time needed for the spin-down or spin-up (in particular, a time needed for the spin-down or spin-up performed in the RAID group which becomes the transfer destination of the file), a delay due to the spin-down or spin-up in a short while decreases an access-capable time-zone. On account of this, applying the spin-down or spin-up during the exceedingly-short halt time-zone results in the occurrence of an overhead. Even in the case of a time-zone during which an access is made, if the spin-down or spin-up is performed during the time-zone, the time-zone can be said to be a coupling-incapable time-zone as is indicated by the bold line in FIG. 23.

In view of this situation, as illustrated in FIG. 23, the time needed for the spin-down or spin-up is measured in advance (the measured time is stored into, e.g., the memory 1008). Moreover, in the blank portion (i.e., the time-zone during which no access is made) shorter than the time needed for the spin-down or spin-up, the access is regarded as having occurred (the dashed line in FIG. 24). Then, the grouping is applied to the access time-zones.

(Step S5)

Figure 20:
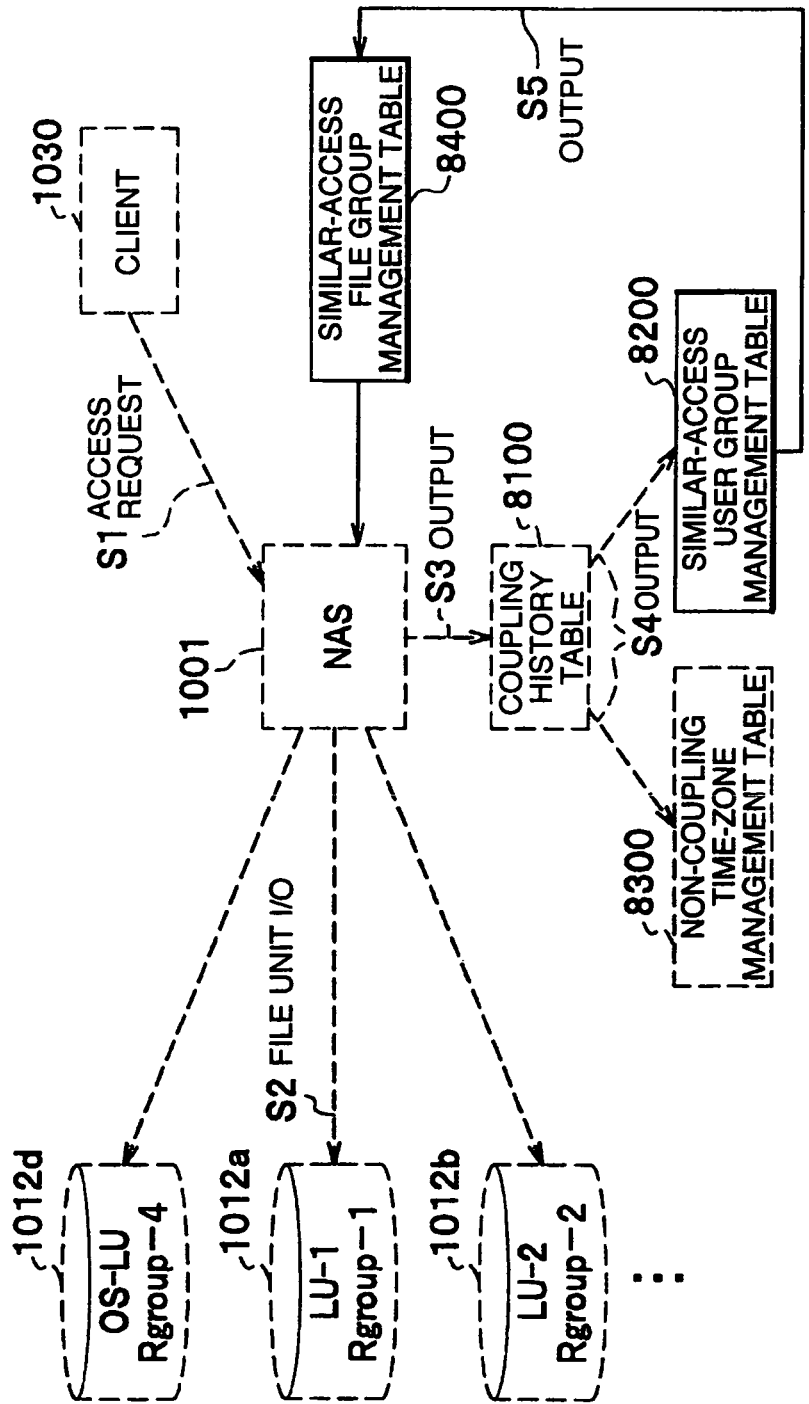
FIG. 20 is a diagram for illustrating a processing for applying the grouping to files on the basis of a pseudo-access user group.

FIG. 20 is a diagram for illustrating a processing for applying the grouping to files on the basis of a pseudo-access user group. The NAS 1001 makes reference to the access-right information on each file, thereby identifying a file which is readable/writable by only the user included in the similar-access user group in the similar-access user group unit indicated in the similar-access user group management table 8200 and determined at the step S2. Furthermore, the NAS 1001 outputs the identified file to the similar-access file group management table 8400, then applying the grouping to the file groups of the same group. These grouped files will be referred to as "similar-access file group".

Concretely, the method for identifying the file is as follows: The i-node table 303 of the file system illustrated in FIG. 6 is retrieved, using the user name included in the similar-access user group management table 8200. Moreover, a file is extracted whose user name coincides with the owner 602, or which belongs to the user's group, and has the read right (R) and write right (W).

In the present embodiment, when identifying the file whose data should be transferred, the i-node table 303 is utilized. This utilization of the i-node table makes it possible to reduce a delay in the file identification processing due to an increase in the file number.

(Step S6 and Step S7)

Figure 21:
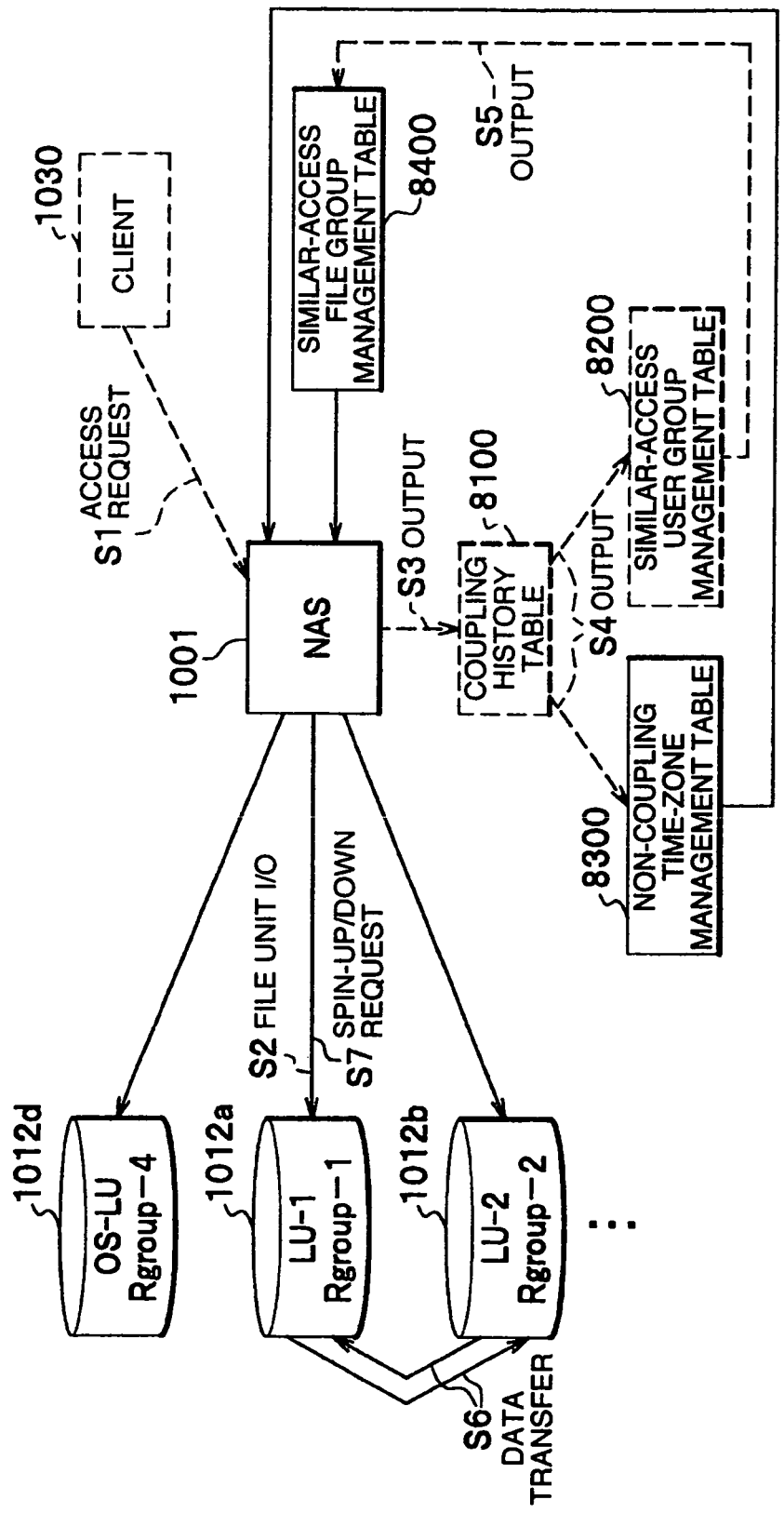
FIG. 21 is a diagram for illustrating a processing for the data transfer and power-saving control.

FIG. 21 is a diagram for illustrating a processing for the data transfer and power-saving control. The NAS 1001 transfers the similar-access file group identified at the step S3 to the file system existing on a different RAID group, then updating the mapping table 6000. Also, based on the non-coupling time-zone management table 8300, the NAS 1001 instructs execution of the power-saving control (i.e., spin-down/spin-up request).

When transferring the file, the RAID group of each group grouped at the step S4 is determined. Moreover, the file in the similar-access file group management table 8400 is transferred so that the file belongs to the RAID group determined. Furthermore, it is preferable that, based on the non-coupling time-zone management table 8300, the spin-down be applied to the RAID group in the non-coupling time-zone, and the spin-up be applied to the RAID group in the coupling time-zone.

Next, the explanation will be given below concerning the details of the processing flow performed by the file sharing program 3100.

Figure 25:
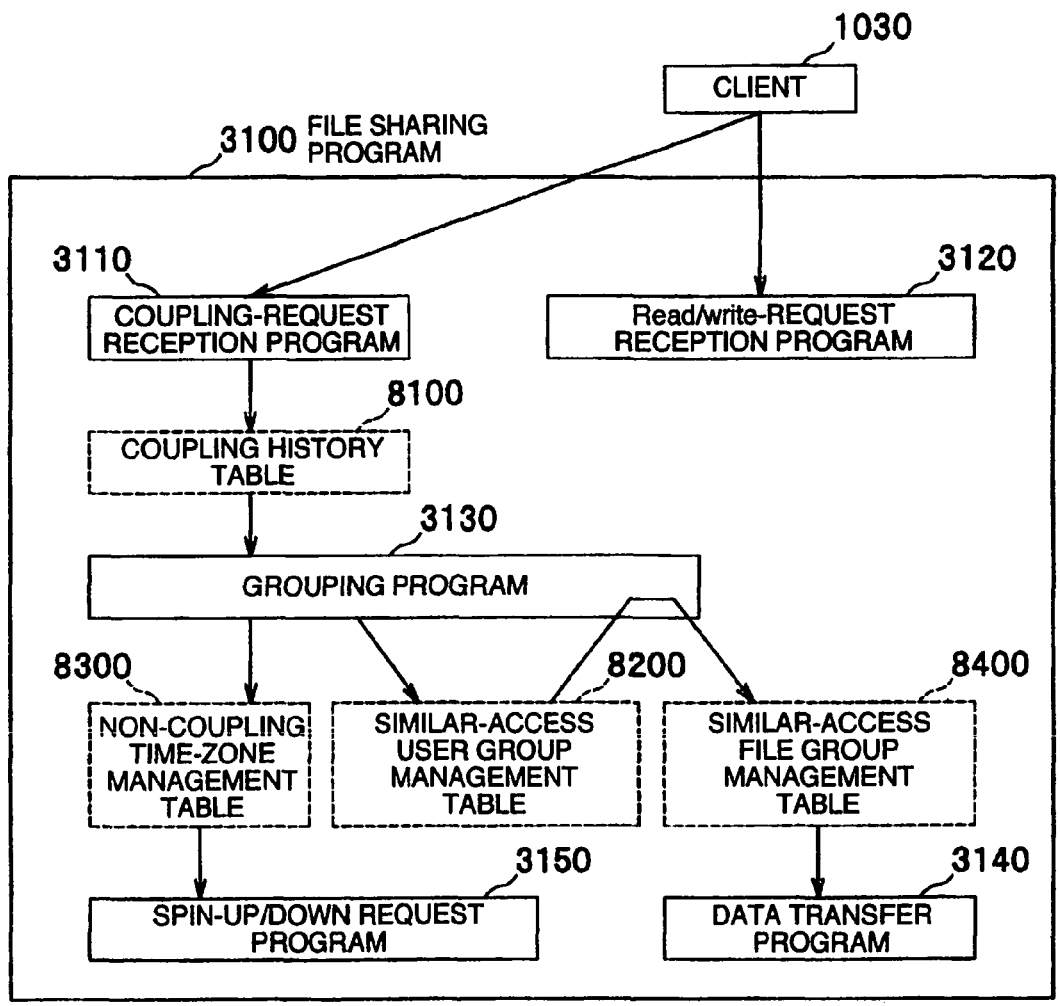
FIG. 25 is a diagram for illustrating an entire processing flow of the file sharing program according to the first embodiment.

FIG. 25 is a diagram for illustrating an entire processing flow of the file sharing program according to the first embodiment. When a coupling request is made to the NAS 1001 from the user who uses the client 1030, the coupling-request reception program 3110 (refer to FIG. 26) of the file sharing program 3100 performs the reception processing. Simultaneously, the Read/Write-request reception program 3120 (refer to FIG. 27) performs the reception processing with respect to a file read request and file write request.

The coupling-request reception program 3110 records the coupling history on the user into the coupling history table 8100. The grouping program 3130 (refer to FIG. 28) makes reference to the coupling history table 8100, then applying the grouping to the users for each similar non-coupling time-zone. Then, the program 3130 outputs the users-grouped result to the similar-access user group management table 8200. Also, the program 3130 establishes the mutual relationship between each grouped group and the non-coupling time-zone, then outputting the relationship-established result to the non-coupling time-zone management table 8300. Moreover, the grouping program 3130 makes reference to the similar-access user group management table 8200, thereby identifying a file which is readable/writable by only the user included in the similar-access user group. Furthermore, the program 3130 outputs the identified file to the similar-access file group management table 8400.

The spin-up/down request program 3150 (refer to FIG. 29) makes reference to the non-coupling time-zone management table 8300, thereby performing the spin-down/spin-up processing. Meanwhile, the data transfer program 3140 (refer to FIG. 30) makes reference to the similar-access file group management table 8400, thereby performing the file transfer processing.

Incidentally, referring to FIG. 26 to FIG. 30, the explanation will be given below concerning the details of the processing flow of each program.

(Coupling-Request Reception Processing)

Figure 26:
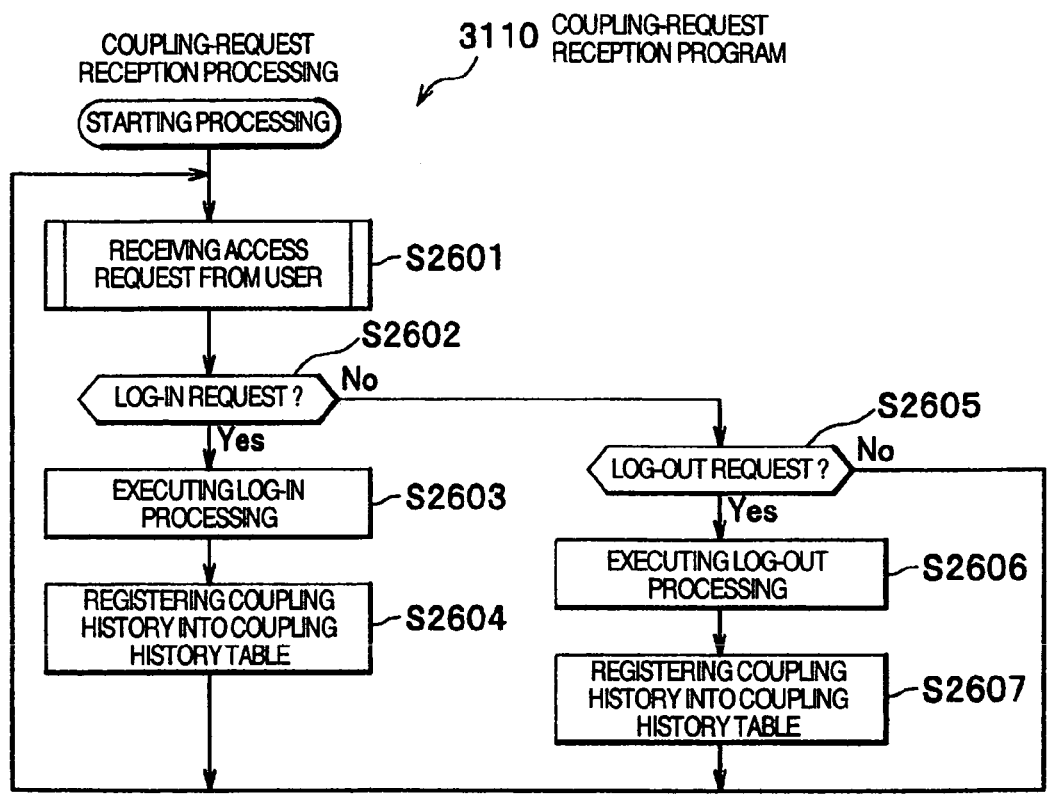
FIG. 26 is a diagram for illustrating the processing flow of the coupling-request reception program.

FIG. 26 is a diagram for illustrating the processing flow of the coupling-request reception program. The coupling-request reception program 3110 is a program for receiving an access request from a user, in particular, a log-in request and log-out request therefrom, acquiring time-and-date of the coupling/decoupling from the user to/from the NAS 1001, and registering the coupling history on access requests into the coupling history table 8100 (refer to FIG. 12). Although the main component for the processing is the CPU 1002, the explanation will be given such that the processing is implemented by the program.

Figure 27:
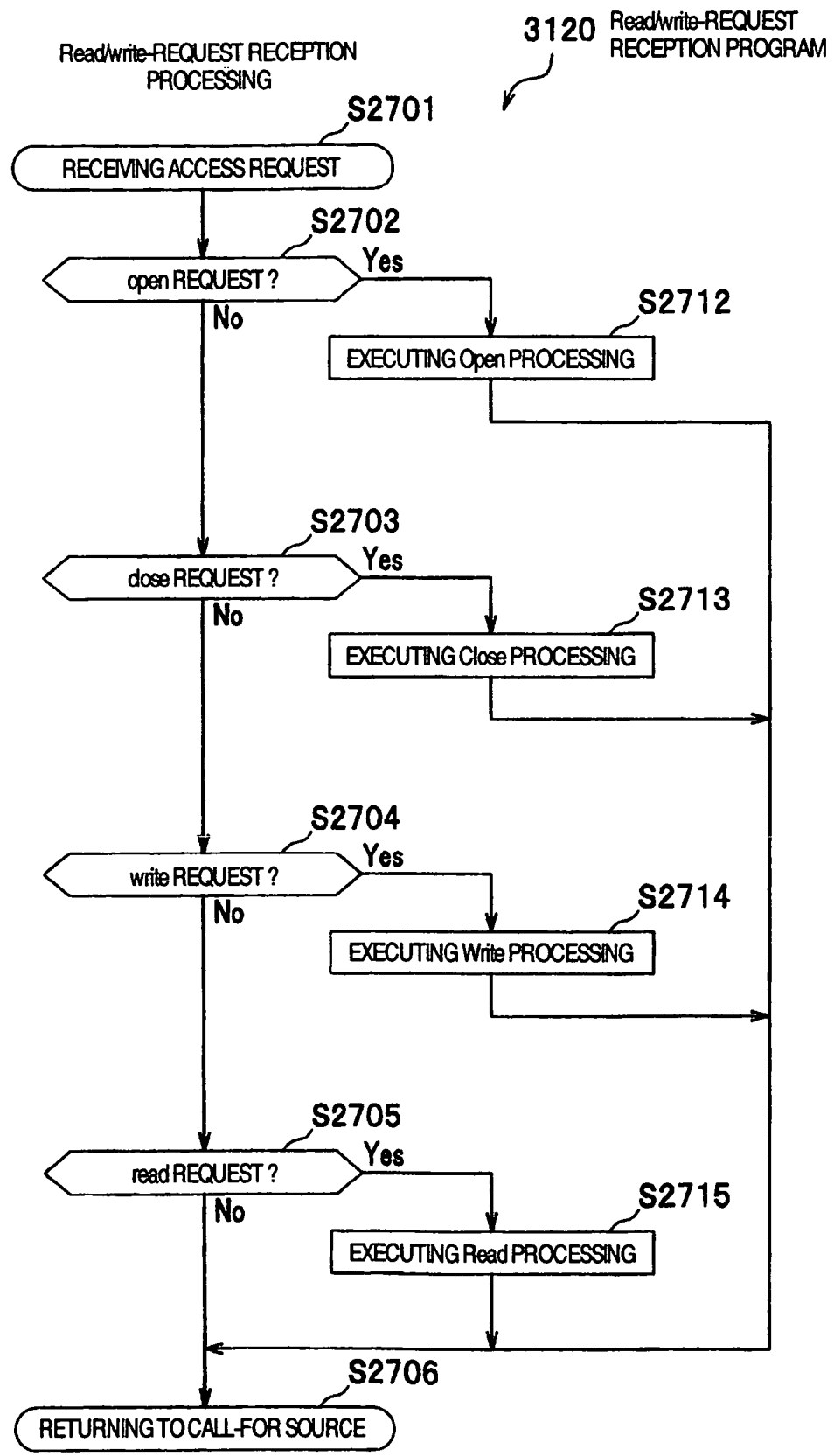
FIG. 27 is a diagram for illustrating the processing flow of the Read/Write-request reception program.

After having received the access request from the user illustrated in FIG. 27 (step S2601), the coupling-request reception program 3110 judges whether or not the access request is a log-in request (step S2602). If the access request is the log-in request (step S2602, Yes), the program 3110 executes a log-in processing such as user ID and password authentication (step S2603). Moreover, the coupling-request reception program 3110 registers the coupling history on coupling requests from the user, the times-and-dates, and the user name into the coupling history table 8100 (step S2604), then returning back to the step S2601.

Meanwhile, if the access request is not the log-in request (step S2602, No), the program 3110 judges whether or not the access request is a log-out request (step S2605). If the access request is the log-out request (step S2605, Yes), the program 3110 executes a log-out processing (step S2606). Furthermore, the coupling-request reception program 3110 registers the coupling history on decoupling requests from the user, the times-and-dates, and the user name into the coupling history table 8100 (step S2607). Meanwhile, if the access request is not the log-out request (step S2605, No), the program 3110 returns back to the step S2601.

(Read/Write-Request Reception Processing)

FIG. 27 is a diagram for illustrating the processing flow of the Read/Write-request reception program. The Read/Write-request reception program 3120 is a program for performing a file Open processing, a file Close processing, a file Read processing, and a file Write processing. Although the main component for the processing is the CPU 1002, the explanation will be given such that the processing is implemented by the program.

Having received the access request from the step S2601 in FIG. 26 (step S2701), the Read/Write-request reception program 3120 judges whether or not the access request is an open request (step S2702). If the access request is not the open request (step S2702, No), the program 3120 judges whether or not the access request is a close request (step S2703). If the access request is not the close request (step S2703, No), the program 3120 judges whether or not the access request is a write request (step S2704). If the access request is not the write request (step S2704, No), the program 3120 judges whether or not the access request is a read request (step S2705). If the access request is not the read request (step S2705, No), the program 3120 returns back to the step S2601 of the call-for source (step S2706).

If the Read/Write-request reception program 3120 judges that the access request is the open request (step S2702, Yes), the program 3120 executes the Open processing (step S2712), then proceeding to the step S2706.

If the Read/Write-request reception program 3120 judges that the access request is the close request (step S2703, Yes), the program 3120 executes the Close processing (step S2713), then proceeding to the step S2706.

If the Read/Write-request reception program 3120 judges that the access request is the write request (step S2704, Yes), the program 3120 executes the Write processing (step S2714), then proceeding to the step S2706.

If the Read/Write-request reception program 3120 judges that the access request is the read request (step S2705, Yes), the program 3120 executes the Read processing (step S2715), then proceeding to the step S2706.

(Grouping Processing)

Figure 28:
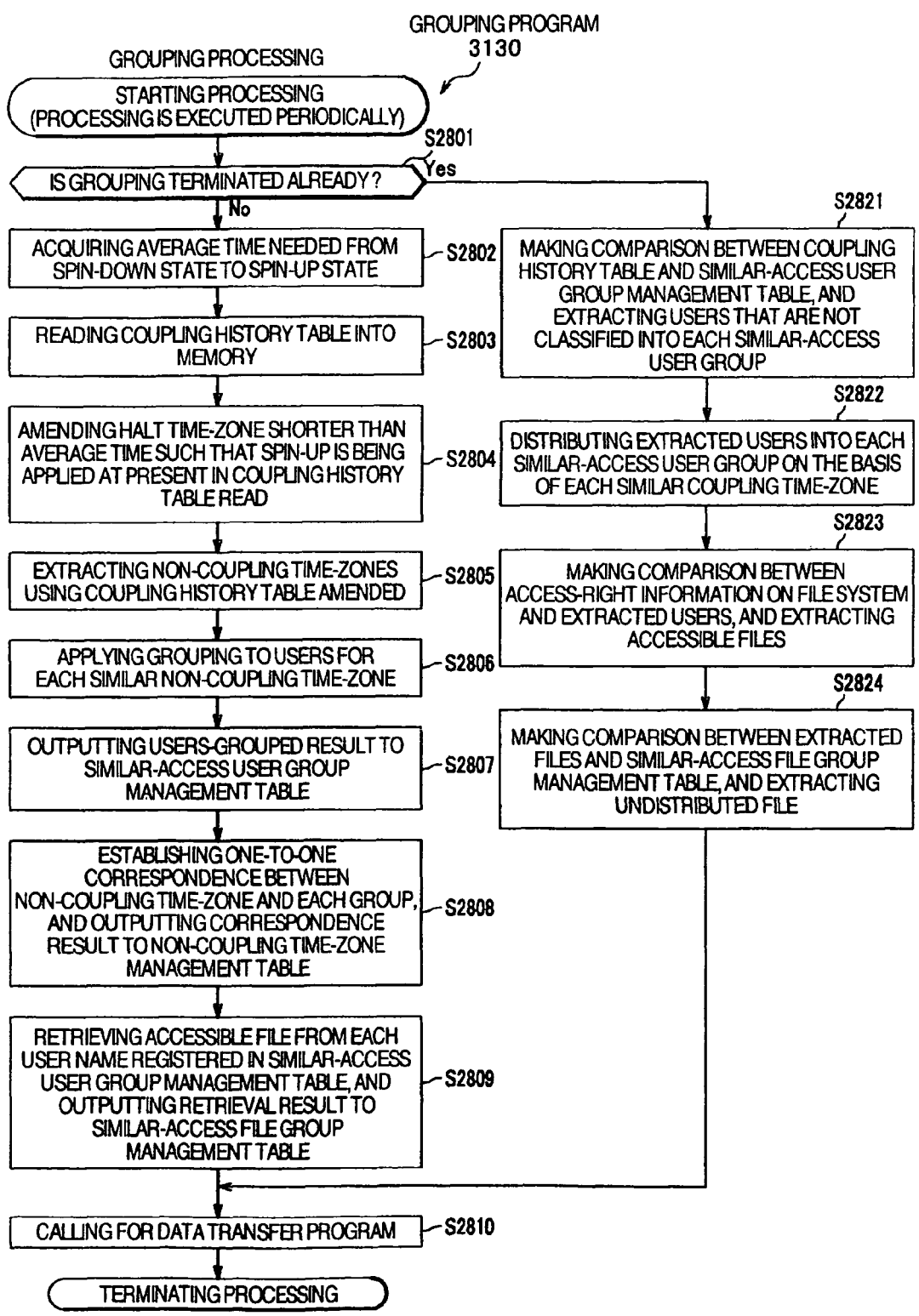
FIG. 28 is a diagram for illustrating the processing flow of the grouping program.

FIG. 28 is a diagram for illustrating the processing flow of the grouping program. The grouping program 3130 is a program for performing the following processing: Based on the user history information, the grouping program 3130 extracts the non-coupling time-zone for each user. Next, the program 3130 applies a grouping to the users for each similar non-coupling time-zone, then outputting the users-grouped result to the similar-access user group management table 8200 (refer to FIG. 13). Moreover, the program 3130 establishes a one-to-one correspondence between the non-coupling time-zone and each user group, then outputting the correspondence result to the non-coupling time-zone management table 8300 (refer to FIG. 14). Furthermore, the program 3130 retrieves an accessible file from each user name registered in the similar-access user group management table 8200, then outputting the retrieval result to the similar-access file group management table 8400 (refer to FIG. 15). Finally, the program 3130 calls for the data transfer program 3140. Although the main component for the processing is the CPU 1002, the explanation will be given such that the processing is implemented by the program.

The grouping program 3130 judges whether or not the users have been grouped already (step S2801). If the users have been not grouped already (step S2801, No), the program 3130 acquires an average time needed from the spin-down state to the spin-up state (step S2802), then proceeding to a step S2803. Incidentally, acquiring the average time is performed as follows: The spin-up/down request program 3150 measures in advance the time needed for the spin-down or spin-up. Then, the measured time is stored into, e.g., the memory 1008.

The grouping program 3130 reads the coupling history table 8100 into the memory 1008 (step S2803). Then, in the coupling history table 8100 read into the memory, the program 3130 amends a halt time-zone shorter than the average time in such a manner that the spin-up is being applied during this halt time-zone at present (step S2804). Moreover, using the coupling history table 8100 amended in this way, the grouping program 3130 extracts the non-coupling time-zone for each user (step S2805), then applying a grouping to the users for each similar non-coupling time-zone (step S2806). Next, the grouping program 3130 outputs the users-grouped result (i.e., each group name and each user name) to the similar-access user group management table 8200 (step S2807). Furthermore, the program 3130 establishes a one-to-one correspondence between the non-coupling time-zone and each user group, then outputting the correspondence result to the non-coupling time-zone management table 8300 (step S2808). In addition, the program 3130 retrieves an accessible file from each user name registered in the similar-access user group management table 8200, then outputting the retrieval result to the similar-access file group management table 8400 (step S2809), then proceeding to a step S2810.

Meanwhile, if, at the S2801, the grouping program 3130 judges that the users have been grouped already (step S2801, Yes), the program 3130 makes a comparison between the coupling history table 8100 and the similar-access user group management table 8200, thereby extracting users which have been not classified into each similar-access user group (step S2821). Moreover, the program 3130 distributes the extracted users into each similar-access user group on the basis of each similar coupling time-zone (step S2822). Furthermore, the grouping program 3130 makes a comparison between the access-right information on the file system and the extracted users, thereby extracting accessible files (step S2823). In addition, the grouping program 3130 makes a comparison between the extracted files and the similar-access file group management table 8400, thereby extracting an undistributed file (step S2824), then proceeding to the step S2810.

Finally, at the step S2810, the program 3130 calls for the data transfer program 3140. The data transfer program 3140 performs the data transfer such that the similar-access file groups are summarized into a single RAID group. This terminates the series of processings.

(Spin-Up/Down Request Processing)

Figure 29:
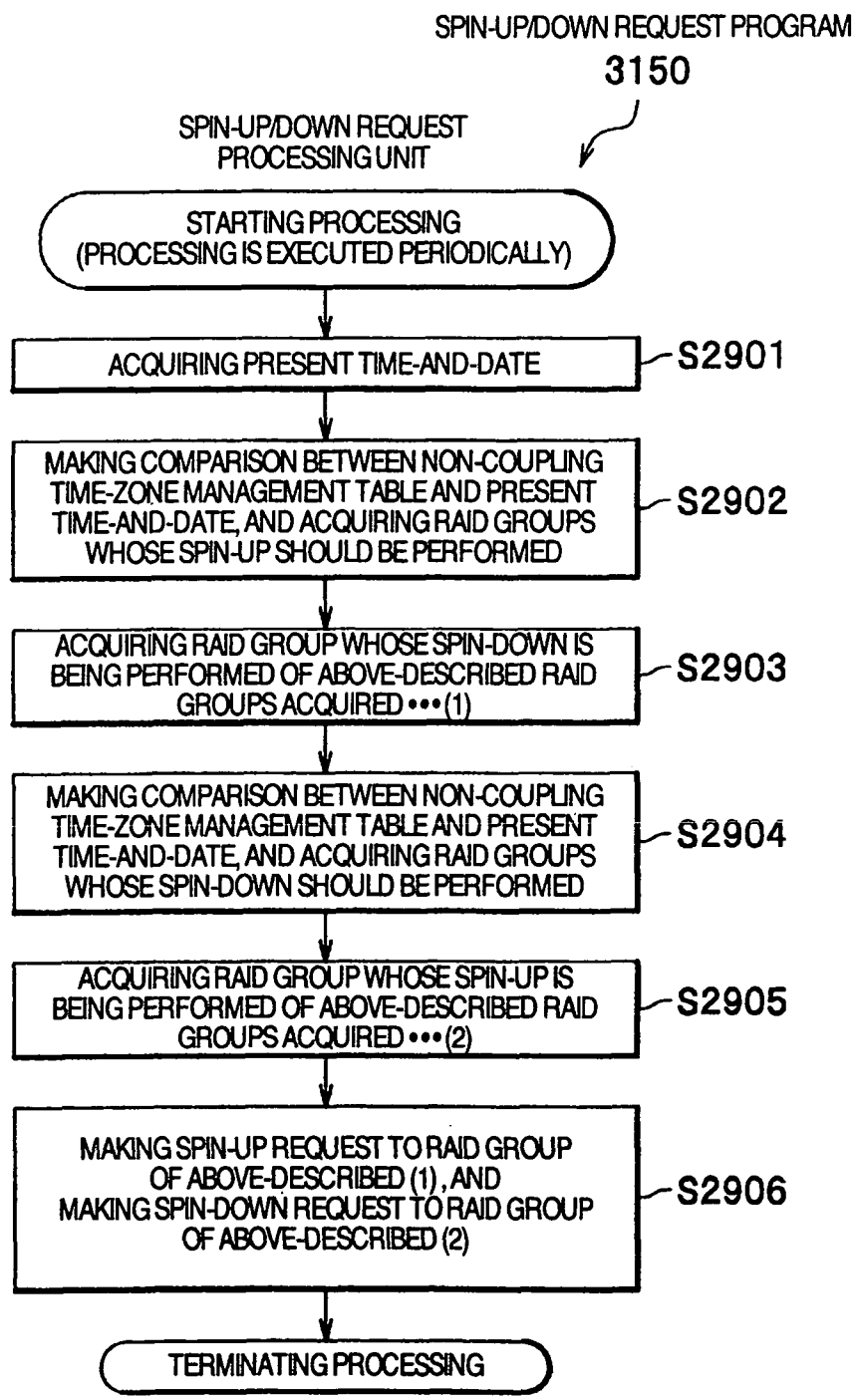
FIG. 29 is a diagram for illustrating the processing flow of the spin-up/down request program.

FIG. 29 is a diagram for illustrating the processing flow of the spin-up/down request program. The spin-up/down request program 3150 is a program for performing the spin-up or spin-down of a RAID group created in the RAID subsystem 1014. The spin-up/down request program 3150 is executed periodically. Although the main component for the processing is the CPU 1002, the explanation will be given such that the processing is implemented by the program.

The spin-up/down request program 3150 acquires the present time-and-date (step S2901). Next, the program 3150 makes a comparison between the non-coupling time-zone management table 8300 and the present time-and-date, thereby acquiring RAID groups whose spin-up should be performed (step S2902). Moreover, of the RAID groups acquired at the step S2902, the program 3150 acquires a RAID group whose spin-down is being performed at present (step S2903). Additionally, the RAID groups whose spin-up should be performed are the RAID groups corresponding to the group names 8301 of the coupling time-zones (i.e., time-zones which are not the non-coupling time-zones) (refer to FIG. 14) in the non-coupling time-zone management table 8300.

Also, similarly, the spin-up/down request program 3150 makes a comparison between the non-coupling time-zone management table 8300 and the present time-and-date, thereby acquiring RAID groups whose spin-down should be performed (step S2904). Moreover, of the RAID groups acquired at the step S2904, the program 3150 acquires a RAID group whose spin-up is being performed at present (step S2905). Additionally, the RAID groups whose spin-down should be performed are the RAID groups corresponding to the group names 8301 of the non-coupling time-zones in the non-coupling time-zone management table 8300.

In addition, at a step S2906, the spin-up/down request program 3150 makes a spin-up request to the RAID group acquired at the step S2903, and makes a spin-down request to the RAID group acquired at the step S2905, then terminating the processing.

(Data Transfer Processing)

Figure 30:
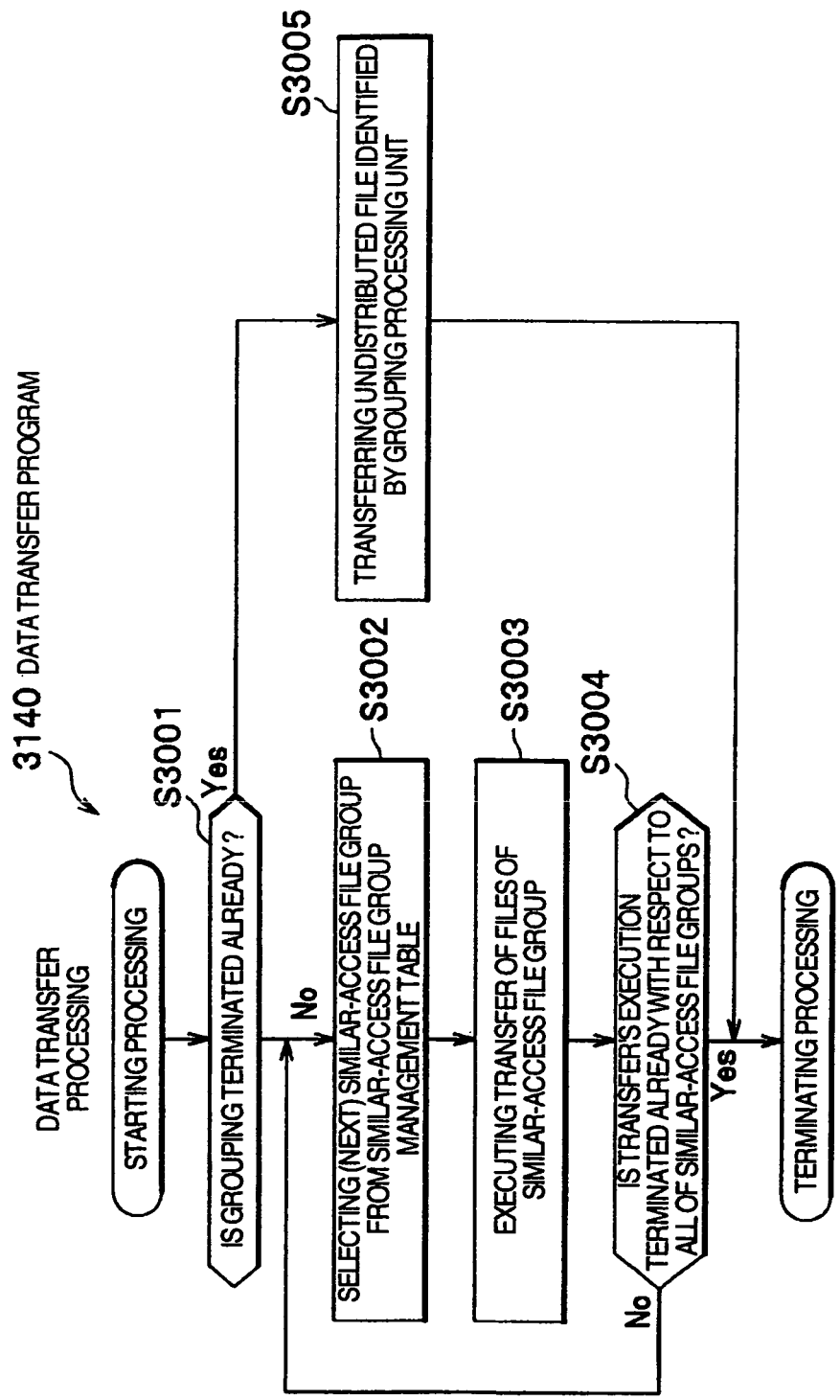
FIG. 30 is a diagram for illustrating the processing flow of the data transfer program.

FIG. 30 is a diagram for illustrating the processing flow of the data transfer program. The data transfer program 3140 is a program for transferring a file, which is stored in a certain RAID group of the RAID subsystem 1014, into another RAID group of the RAID subsystem 1014. Although the main component for the processing is the CPU 1002, the explanation will be given such that the processing is implemented by the program.

The data transfer program 3140 is called for at the step S2810 (refer to FIG. 28) of the grouping processing. The data transfer program 3140 judges whether or not the files have been grouped already (step S3001). If the files have been not grouped already (step S3001, No), the program 3140 selects the (next) similar-access file group (i.e., files obtained by grouping the file groups of the same group) from the similar-access file group management table 8400 (step S3002). Next, the program 3140 executes transfer of the files so that the files are collected onto the same RAID group (step S3003). Moreover, the data transfer program 3140 judges whether or not the transfer's execution has been terminated with respect to all of the similar-access file groups (step S3004). If the transfer's execution has been terminated (step S3004, Yes), the program 3140 terminates the processing. Meanwhile, if the transfer's execution has been not terminated (step S3004, No), the program 3140 returns back to the step S3002.

Meanwhile, if, at the step S3001, the files have been grouped already (step S3001, Yes), the data transfer program 3140 carries out transfer of the undistributed file which has been identified (extracted) at the step S2824 of the grouping processing (step S3005), then terminating the processing.

When the data transfer program 3140 performs the transfer of a file, the program 3140 makes reference to the hierarchical management table 4000, the mapping table 6000, and the similar-access file group management table 8400. In the case of performing the transfer of a file, in the mapping table 6000 (refer to FIG. 11), the mapping is changed by changing the values registered into the RAID group name 6003, the file system name 6004, and the real-file-system-dedicated i-node number 6005 with respect to this file. This operation makes it possible to conceal, from the user, the change in the storage positions of the file due to the file transfer.

In the present embodiment, the grouping is applied to the users whose coupling time-zones are similar to each other. Moreover, files associated with the grouped users are collected into the same RAID group. This feature lengthens the time-zone (i.e., non-coupling time-zone) during which no access is made to the RAID group, thereby permitting implementation of an increase in the spin-down time for the RAID group, and an increase in the number of the RAID groups whose spin-down should be performed. As a consequence, it becomes possible to enhance the power-saving effect.

Also, in the present embodiment the files which should be grouped are determined from the coupling time-zone for a user, and files which the user has accessed. This feature makes it possible to grasp the access time-zone which is appropriate for the utilization/management of the NAS 1001, thereby allowing an enhancement in the accuracy of the scheduling (i.e., spin-up/spin-down).

Embodiment 2

In the first embodiment, the access-right information has been used in the case of identifying a file used by a user. In general, the access-right information is static access information whose update frequency is low. Meanwhile, access information based on an access log is dynamical access information whose update frequency is high. Accordingly, in the second embodiment, the explanation will be given below concerning a file-identifying method based on the access log. Incidentally, the following explanation will be given regarding a processing which co-uses the access log and the coupling history table as a preferred embodiment. The processing which uses only the access log, however, is also allowable.

Figure 32:
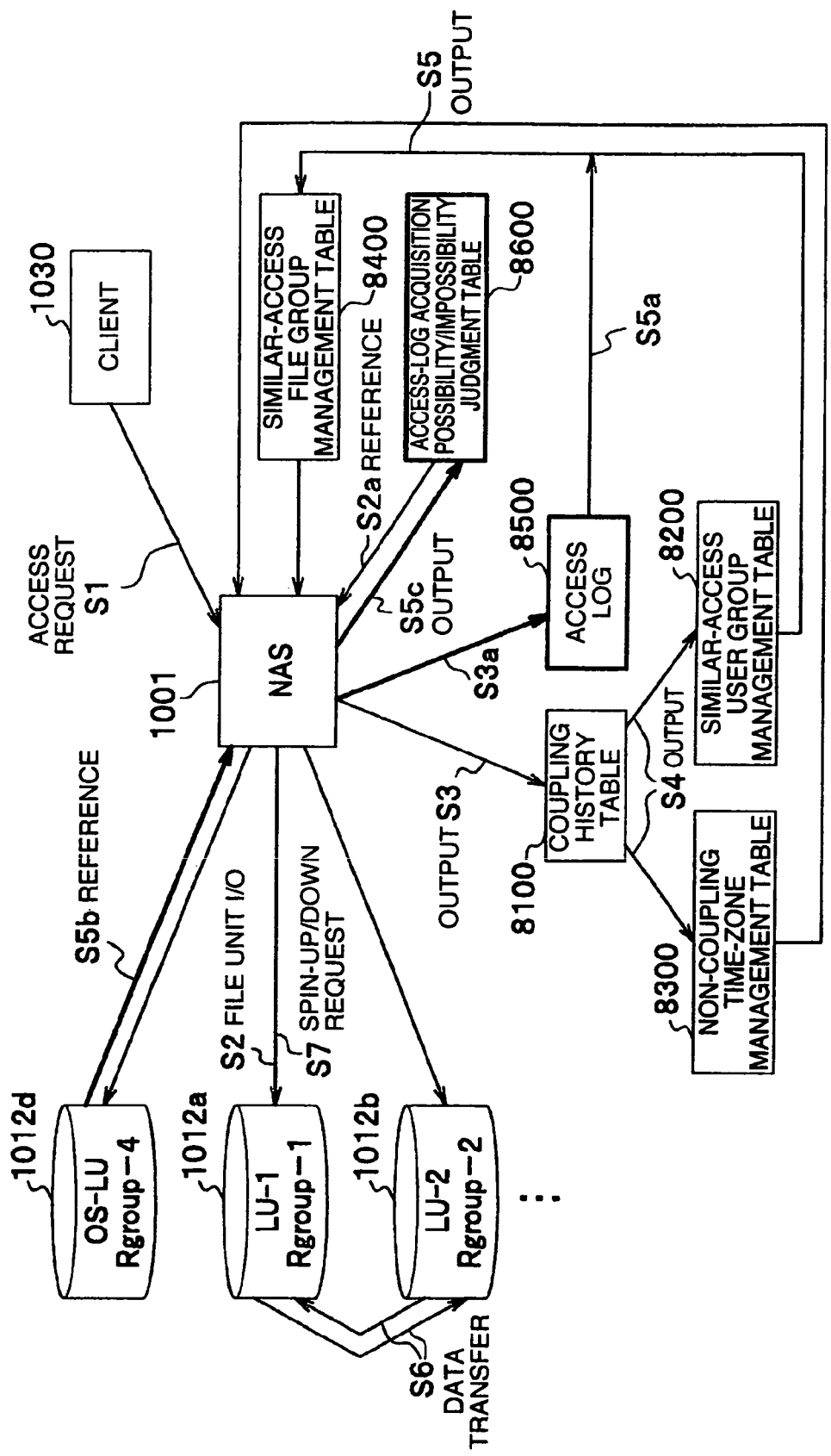
FIG. 32 is a diagram for illustrating the processing outline of the file sharing program according to the second embodiment.

FIG. 32 is a diagram for illustrating the processing outline of the file sharing program according to the second embodiment. In FIG. 32, steps S2a, S3a, S5a, S5b, and S5c are further added in comparison with FIG. 17.

When the NAS 1001 receives an access request from the user of a client 1030 that had established the coupling (step S1), the NAS 1001 makes reference to the mapping table 6000 within the OS-LU (1012d), then executing the file unit I/O (step S2). At the time of the log-in/log-out of the user, the NAS 1001 records (outputs), into the coupling history table 8100, the user name and a point-in-time at which the client 1030 had established the coupling to the NAS 1001 (step S3). Additionally, it is preferable that the processing be performed in a certain constant time so as to accumulate the coupling history into the coupling history table 8100.

Moreover, in order to judge access-log acquisition possibility/impossibility, the NAS 1001 makes reference to an access-log acquisition possibility/impossibility judgment table 8600 (step S2a), then checking the flag (ON/OFF) for a file which is the access-request destination. If the flag is found to be ON, the NAS 1001 records, into an access log 8500, the user name, access-target file, and file size which the NAS 1001 had accessed at the time of the file unit I/O (step S3a).

The NAS 1001 makes reference to the coupling history table 8100, then applying the grouping to the users (each resultant group will be referred to as "similar-access user group") on the basis of each similar non-coupling time-zone. Then, the NAS 1001 outputs the users-grouped result to the similar-access user group management table 8200. Also, the NAS 1001 establishes the mutual relationship between each grouped group and the non-coupling time-zone, then outputting the relationship-established result to the non-coupling time-zone management table 8300 (step S4).

The NAS 1001 makes reference to the access-right information on each file. Then, the NAS 1001 makes a comparison between the access log 8500 and the similar-access user group determined at the step S4 and indicated in the similar-access user group management table 8200, thereby identifying a file from the access log 8500 (step S5a). With respect to users other than the ones described in the access log 8500, the NAS 1001 makes reference to the access-right information on each file, thereby identifying a file which is readable/writable by only the user included in the similar-access user group in the similar-access user group unit and determined at the step S4. Furthermore, the NAS 1001 outputs the identified file to the similar-access file group management table 8400, then applying the grouping to the file groups of the same group (step S5). Also, the NAS 1001 checks the number of users that are accessible to the file from the access-right information on each file. Then, if the number is found to be larger than a predetermined value, it is advisable to set, at ON, the flag for the file in the access-log acquisition possibility/impossibility judgment table 8600 (step S5b and step S5c). Additionally, the processings at the steps S6 and S7 are the same as the ones illustrated in FIG. 21. Accordingly, the explanation thereof will be omitted here.

FIG. 33 is a diagram for illustrating the data structure of the access log. The access log 8500 is log information which is acquired for grasping files accessed by each user and the data amount occurring from the accesses. The access log 8500, which is part of the management information 1010, is constituted by including the user name 8501 of a user that has accessed a file, file name 8502 that the user has accessed, file size 8503, and I/O type 8504. Concretely, the access log 8500 shows that, when the user name is user001, a read request is made to a file of /home/share/a.txt, and that the file size is equal to 20 MB.

FIG. 34 is a diagram for illustrating the data structure of the access-log acquisition possibility/impossibility judgment table. The access-log acquisition possibility/impossibility judgment table 8600 is a table for managing the possibility/impossibility of the access-log acquisition for each file. The access-log acquisition possibility/impossibility judgment table 8600 is constituted by including the file name 8601 and the flag for the access-log acquisition 8602. The file identification based on the access log 8500 can be performed in a limited manner by setting the possibility/impossibility judgment on the access-log acquisition into the access-log acquisition possibility/impossibility judgment table 8600. This feature allows implementation of the compatibility between a reduction in the file-identifying time and an enhancement in the identification accuracy.

Figure 35:
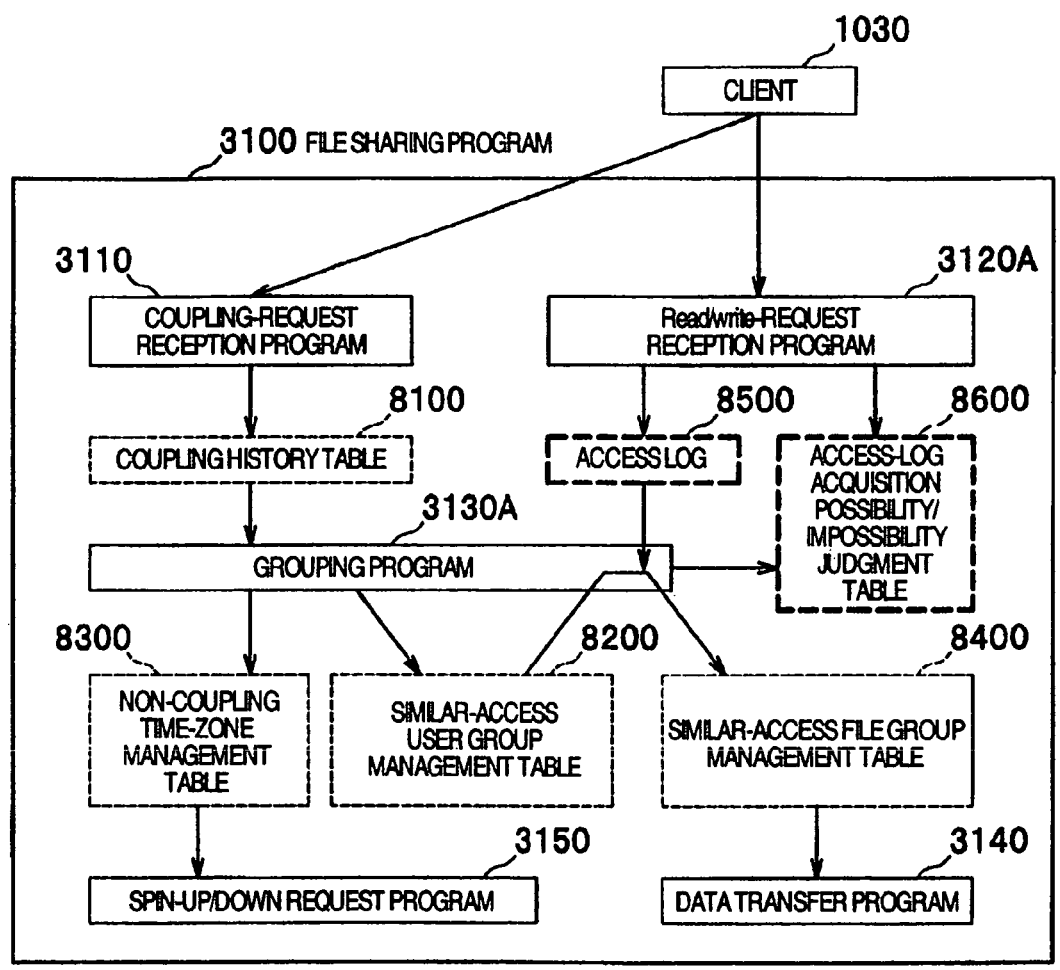
FIG. 35 is a diagram for illustrating the entire processing flow of the file sharing program according to the second embodiment.

FIG. 35 is a diagram for illustrating the entire processing flow of the file sharing program according to the second embodiment. In FIG. 35, the access log 8500 (refer to FIG. 33) and the access-log acquisition possibility/impossibility judgment table 8600 (refer to FIG. 34), which are indicated by the bole dashed lines, are further added in comparison with FIG. 25 in the first embodiment. Moreover, processings by a Read/Write-request reception program 3120A (refer to FIG. 36) and a grouping program 3130A (refer to FIG. 37) are different from the processings in the first embodiment. The same reference numerals are affixed to the same constitution components, and the explanation thereof will be omitted here.

The Read/Write-request reception program 3120A makes reference to the access-log acquisition possibility/impossibility judgment table 8600, thereby outputting the file access history on each user. The grouping program 3130A makes reference to the similar-access user group management table 8200 and the access log 8500, thereby identifying a file, and outputting the file to the similar-access file group management table 8400. Hereinafter, referring to FIG. 36 and FIG. 37, the explanation will be given below concerning the details of the Read/Write-request reception program 3120A and the grouping program 3130A.

Figure 36:
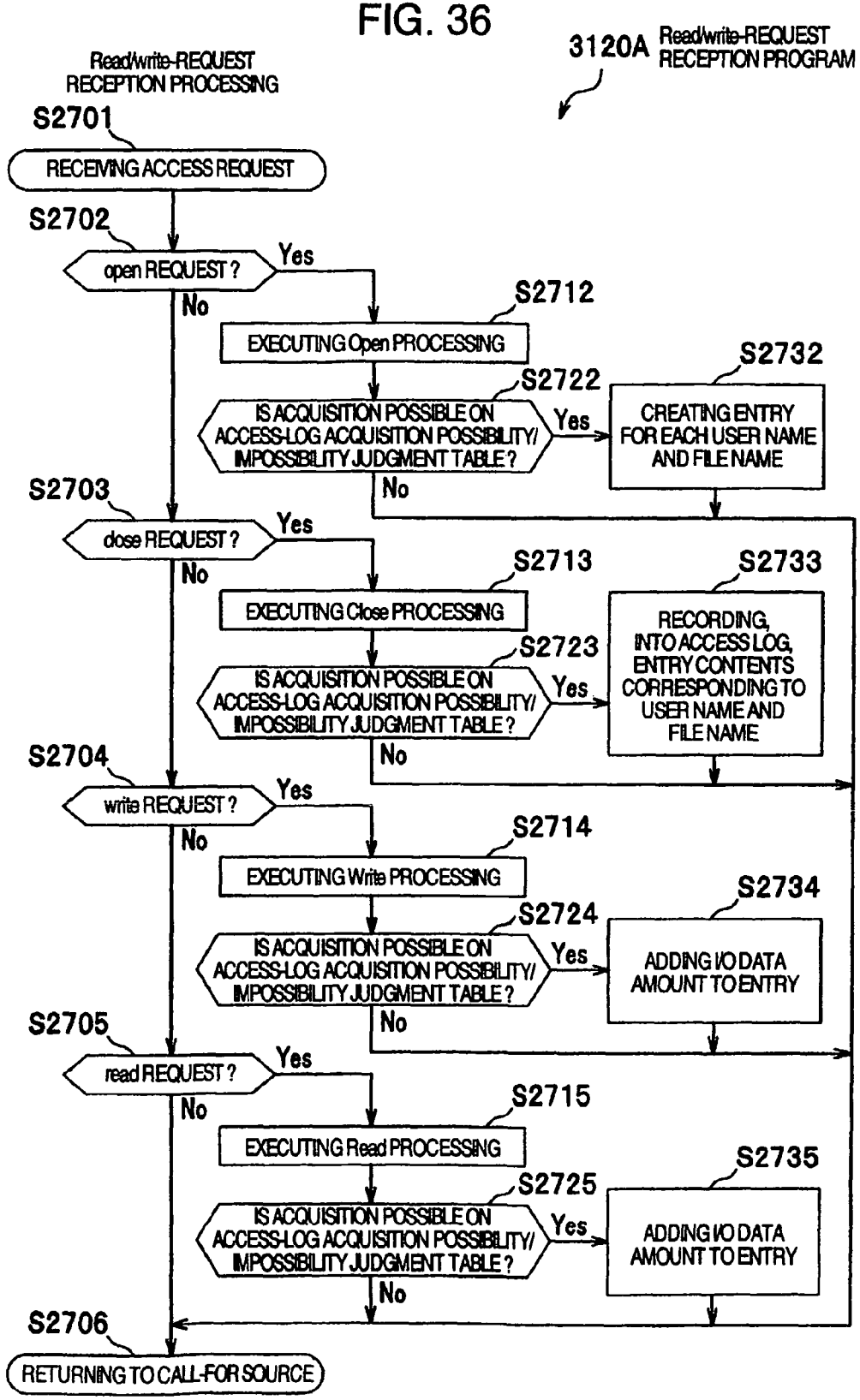
FIG. 36 is a diagram for illustrating a processing flow of the Read/Write-request reception program according to the second embodiment.

FIG. 36 is a diagram for illustrating a processing flow of the Read/Write-request reception program according to the second embodiment. In the Read/Write-request reception program 3120A, steps S2722 and S2732, S2723 and S2733, S2724 and S2734, and S2725 and S2735 are further added in comparison with the Read/Write-request reception program 3120 illustrated in FIG. 27. The same reference numerals are affixed to the same constitution components, and the explanation thereof will be omitted here.

After having executed the Open processing (step S2712), the Read/Write-request reception program 3120A makes reference to the access-log acquisition possibility/impossibility judgment table 8600, then judging whether or not to be able to acquire an access log with respect to a file that the user has accessed (i.e., access-log acquisition possibility/impossibility) (step S2722). Then, if the access log is able to be acquired (step S2722, Yes), the program 3120A creates an entry for each user name and file name into the access log 8500 (step S2732), then proceeding to the step S2706. Meanwhile, if the access log is unable to be acquired (step S2722, No), the program 3120A proceeds to the step S2706.

Incidentally, the entry is an area on the memory 1008 for storing therein storage contents temporarily until the log contents have been determined (from the Open processing to the Close processing). The storage contents are constituted such that a set of the user name, file name, and accumulated-accesses amount constitutes one entry.

After having executed the Close processing (step S2713), the Read/Write-request reception program 3120A makes reference to the access-log acquisition possibility/impossibility judgment table 8600, then judging whether or not to be able to acquire the access log with respect to the file that the user has accessed (step S2723). Then, if the access log is able to be acquired (step S2723, Yes), the program 3120A records, into the access log 8500, the entry contents corresponding to the user name and file name (step S2733), then proceeding to the step S2706. Meanwhile, if the access log is unable to be acquired (step S2723, No), the program 3120A proceeds to the step S2706.

After having executed the Write processing (step S2714), the Read/Write-request reception program 3120A makes reference to the access-log acquisition possibility/impossibility judgment table 8600, then judging whether or not to be able to acquire the access log with respect to the file that the user has accessed (step S2724). Then, if the access log is able to be acquired (step S2724, Yes), the program 3120A adds the I/O data amount to the entry (step S2734), then proceeding to the step S2706. Meanwhile, if the access log is unable to be acquired (step S2724, No), the program 3120A proceeds to the step S2706.

After having executed the Read processing (step S2715), the Read/Write-request reception program 3120A makes reference to the access-log acquisition possibility/impossibility judgment table 8600, then judging whether or not to be able to acquire the access log with respect to the file that the user has accessed (step S2725). Then, if the access log is able to be acquired (step S2725, Yes), the program 3120A adds the I/O data amount to the entry (step S2735), then proceeding to the step S2706. Meanwhile, if the access log is unable to be acquired (step S2725, No), the program 3120A proceeds to the step S2706.

Figure 37:
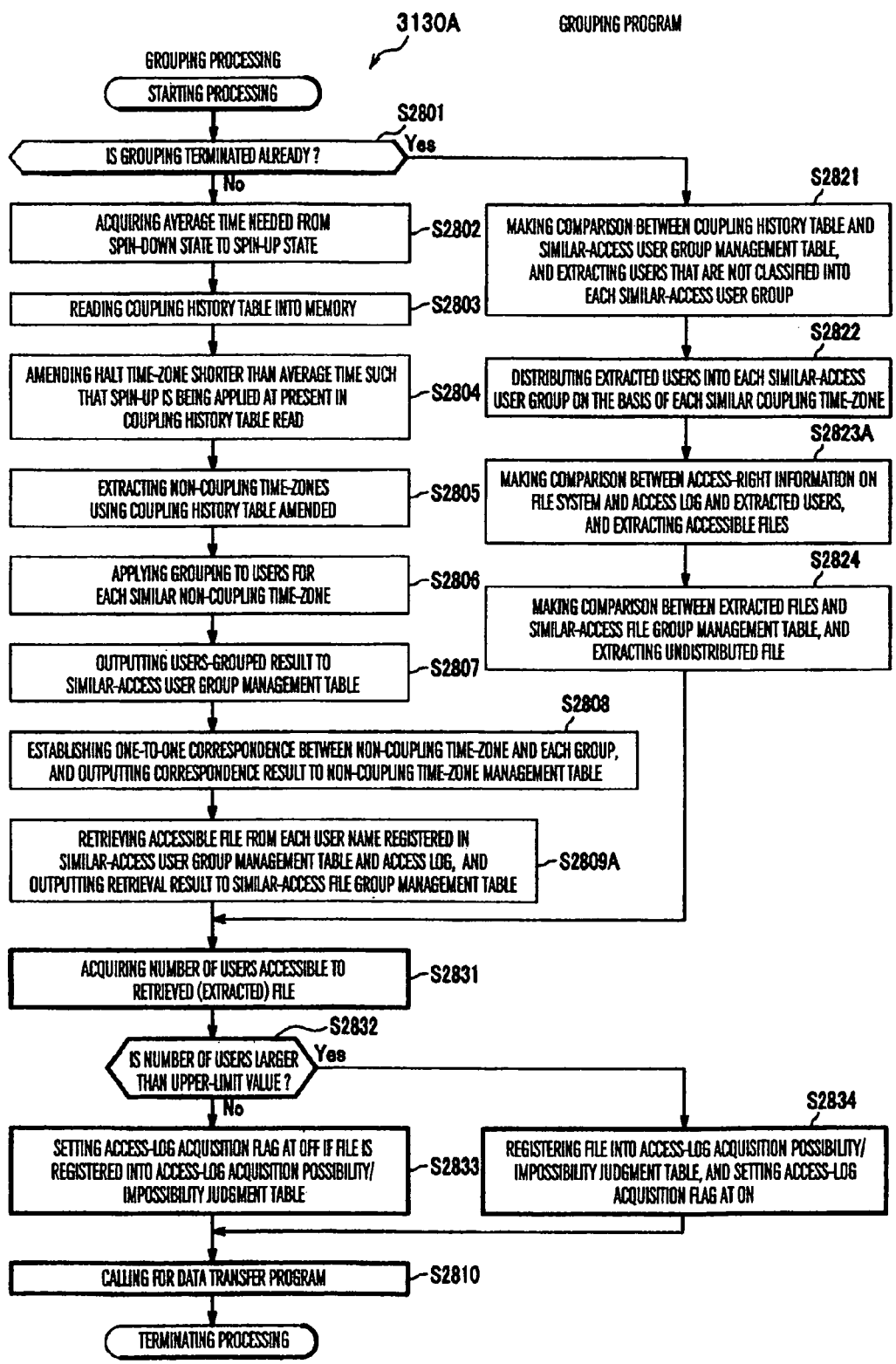
FIG. 37 is a diagram for illustrating a processing flow of the grouping program according to the second embodiment.

FIG. 37 is a diagram for illustrating a processing flow of the grouping program according to the second embodiment. In the grouping program 3130A, steps S2831 to S2834 are further added in comparison with the grouping program 3130 illustrated in FIG. 28. Also, processings at a step S2809A and a step S2823A are partially different from the processings at the step S2809 and the step S2823 illustrated in FIG. 28. The same reference numerals are affixed to the other same constitution components, and the explanation thereof will be omitted here.

After the step S2808, the grouping program 3130A retrieves an accessible file from each user name registered in the similar-access user group management table 8200 and the access log 8500, then outputting the retrieval result to the similar-access file group management table 8400 (step S2809A), then proceeding to the step S2831.

The grouping program 3130A acquires the number of users that are accessible to the file retrieved (extracted) (step S2831). Moreover, the program 3130A judges whether or not the number of the users is larger than a set upper-limit value (step S2832). Then, if the number of the users is larger than the set upper-limit value (step S2832, Yes), the grouping program 3130A newly registers the file into the access-log acquisition possibility/impossibility judgment table 8600, then setting the flag of the access-log acquisition 8602 at ON (step S2834), and proceeding to the step S2810. Meanwhile, if the number of the users is smaller than the set upper-limit value (step S2832, No), the grouping program 3130A sets the flag of the access-log acquisition 8602 at OFF if the file has been registered into the access-log acquisition possibility/impossibility judgment table 8600 (step S2833), then proceeding to the step S2810.

Also, after the step S2822, the grouping program 3130A makes a comparison between the access-right information on the file system and the access log 8500 and the extracted users, thereby extracting accessible files (step S2823A). Furthermore, the program 3130A proceeds to the step S2831 via the step S2824.

In the second embodiment, the file identification based on the access log 8500 can be performed in a limited manner by setting the possibility/impossibility judgment on the access-log acquisition into the access-log acquisition possibility/impossibility judgment table 8600. This feature makes it possible to prevent the access-log information from becoming enormous, and to prevent a time from becoming needed for the file identification.

In the second embodiment, at the step S2809A in FIG. 37, an accessible file is retrieved from each user name registered in the similar-access user group management table 8200 and the access log 8500. Then, the retrieval result is outputted to the similar-access file group management table 8400. The present invention, however, is not limited thereto. For example, it is preferable to grasp the operation pattern of a file (target entity) whose file size 8503 of the access log 8500 illustrated in FIG. 33 is significantly large, and to output a file similar thereto into the similar-access file group management table 8400. On account of this, accumulated-file size, file-access number, and the like exist as the operation pattern of a file access. Incidentally, referring to FIG. 38 to FIG. 40, the explanation will be given below regarding the details of a grouping method for target entities.

Next, the explanation will be given below concerning the details of the grouping method for target entities.

In FIG. 22, the explanation has been given below regarding the method for applying the grouping to users, i.e., target entities, on the basis of the coupling time-zone for each user. Here, the concrete explanation will be given below concerning a method for applying a grouping to target entities (e.g., users, or files) on the basis of similar operation patterns (e.g., time-zones during which users establish the coupling to the NAS 1001, or time-zones during which files are accessed).

FIG. 38 is a diagram for illustrating a case instance of operation patterns of target entities. As the precondition, it is assumed that there exist five target entities (target entity A, target entity B, target entity C, target entity D, and target entity E), and that the operation patterns of the respective target entities are known. Concretely, the target entity A operates from O o'clock to 2 o'clock, from 6 o'clock to 12 o'clock, and from 19 o'clock to 22 o'clock.

FIG. 39A and FIG. 39B are diagrams for illustrating bit maps of the operation time of the target entities. FIG. 39A illustrates the diagram where the operation patterns of the respective target entities illustrated in FIG. 38 are formed into the bit-map representation by determining the resolution degree (e.g., 1 hour, 30 minutes) of time. When the resolution degree is equal to 1 hour, the bit-map size per 1 target entity becomes equal to 24 bits. When forming the operation patterns into the bit-map representation, the point-in-time is rounded up if the point-in-time is larger than one-half of the resolution degree; whereas the point-in-time is rounded down if the point-in-time is smaller than the one-half thereof (e.g., when the resolution degree is equal to 1 hour, 5:45~13:5→6~13). Here, the bit maps from the target entity A to the target entity E are illustrated by setting the resolution degree at 1 hour.

FIG. 39B illustrates the result obtained by applying a grouping to the target entities using the bit maps illustrated in FIG. 39A. Concretely, XOR operation is applied to the bit maps from the target entity A to the target entity E. Then, if the operation results are equal to 0, it is judged that the coincidence holds. Incidentally, if the resolution degree becomes exceedingly small like 5 minutes or 10 minutes, it is also allowable that an upper-limit value of the bit number of the non-coincidence is determined. Then, if the bit number is smaller than the upper-limit value, the coincidence is judged to hold. When applying the XOR operation to the target entity A and the target entity B to the target entity E, the operation results become equal to other than 0, 0, other than 0, and other than 0. Accordingly, the target entity A and the target entity C can be judged to be summarized into a group. Also, when applying the XOR operation to the remaining target entity B, target entity D, and target entity E, the operation results become equal to 0 all. Consequently, the target entity B, target entity D, and target entity E can be judged to be summarized into a group.

Assuming that the groups obtained by applying the grouping to the target entities are Group 1 (A, C) and Group 2 (B, D, E), the bit map corresponding to each group is determined. This bit map is obtained by applying the OR operation to the bit map of the target entity belonging to each group. Additionally, if, hereinafter, a new target entity (user or file) is added and increases, the XOR operation is applied to the bit map of the target entity and the bit map of each group, then distributing the target entity to the group for which the coincidence is found to hold.

FIG. 40 is a diagram for illustrating another bit map of the operation time of the target entities. FIG. 40 is about a case where the number of the target entities is six. Namely, a target entity F is added as compared with the case in FIG. 39A. The inclusion of the target entity F, which operates all the time, sometimes results in a phenomenon that all the operation patterns of the target entity A to the target entity E are eventually summarized into the operation pattern of the target entity F. In order to avoid this phenomenon, it is advisable to determine an upper-limit value out of 24 hours. Moreover, target entities which operate longer than 75% (i.e., 18 hours) of 24 hours are subjected to a filtering. After that, it is advisable to execute basically the same processing as the processing illustrated in FIG. 39A or FIG. 39B. It is preferable to create an all-the-time-operating specific group, and to manage, in this specific group, operation patterns of the target entities eliminated by the filtering.

Incidentally, the embodiment for carrying out the present invention is not limited to the above-described embodiments. Namely, a variety of changes and modifications can also be made with respect to the carry-out embodiment of the present invention.

For example, when selecting a RAID group whose spin-down should be executed, performances of the hard disks may also be taken into consideration. The performances of the hard disks which can be mentioned are, e.g., frequency of the CPU and type, capacity, and reliability of the disks used. This is common to the first embodiment and the second embodiment.

Also, in the present embodiment, the hierarchization of a file system is implemented and utilized. As having been explained already, the selection width for the transfer destination of a file is widened as compared with the case where the stab is used. As the transfer destination, however, it is advisable to select the RAID group as follows: Namely, if the file is accessed very often, a RAID group is desirable which has a high-speed volume creating a real file system whose hierarchy is positioned at a higher order (e.g., FS1 (1015a) (refer to FIG. 1)). Meanwhile, if the file is not accessed very often, a RAID group is desirable which has a low-speed volume creating a real file system whose hierarchy is positioned at a lower order (e.g., FS3 (1015c) (refer to FIG. 1)). Namely, it is advisable to employ the hierarchical characteristics of a file system as the criterion for selecting the transfer destination of a file.

A variety of changes and modifications can also be made as required with respect to concrete constitutions of the other constitution components, such as hardware, software, each table, and each flowchart, within the scope of not departing from the spirit of the present invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A storage system coupled to a client, the storage system comprising:
   a storage apparatus that stores data in a plurality of volumes that form a plurality of RAID groups; and
   a file server that receives file access requests from the client and controls storage of file data in the storage apparatus, and
   wherein the file server is configured to:
      define a set of first users that have similar corresponding time-zones during which access to the data stored in the storage apparatus is not made as a first group;
      relate the first group to a first RAID group of the plurality of RAID groups; and
      associate the first group with a first time-zone that is calculated based on a time-zone required for spin-down and spin-up to be performed in the first RAID group and the corresponding time-zones during which access to the data stored in the storage apparatus is not made for the set of first users,
   wherein a length of the first time-zone is determined in accordance with both a length of the corresponding time-zones and a length of a time period needed for spin-down and spin-up to be performed in the RAID group,
   wherein the storage apparatus is configured to:

migrate data of a file accessed by a user of the set of first users to the first RAID group; and operate the first RAID group in a power saving state during the first time-zone, and wherein the power saving state is a spin-down state.

2. The storage system according to claim 1, wherein the file server manages the corresponding time-zone of each user during which access to the data stored in the storage apparatus is not made based on log-in and log-out requests from the user.

3. The storage system according to claim 1, wherein the length of the first time zone is calculated by subtracting a length of a time period of the corresponding time-zones from a length of the time period needed for spin-down and spin-up to be performed in the RAID group.

4. A file server for controlling storage of file data in a storage apparatus to which the file server is communicatively coupled in a storage system coupled to a client, the storage apparatus storing data in a plurality of volumes that form a plurality of RAID groups, the file server comprising:

an interface that receives file access requests from a client; and a file manager component configured to:

define a set of first users that have similar corresponding time-zones during which access to the data stored in the storage apparatus is not made as a first group;

relate the first group to a first RAID group of the plurality of RAID groups such that the storage apparatus is configured to migrate data of a file accessed by a user of the set of first users to the first RAID group; and associate the first group with a first time-zone that is calculated based on a time-zone required for spin-down and spin-up to be performed in the first RAID group and the corresponding time-zones during which access to the data stored in the storage apparatus is not made for the set of first users such that the storage apparatus is configured to operate the first RAID group in a power saving state during the first time-zone, wherein a length of the first time-zone is determined in accordance with both a length of the corresponding and a length of needed for spin-down and spin-up to be performed in the RAID group, and wherein the power saving state is a spin-down state.

5. The file server according to claim 4, wherein the file manager component manages the corresponding time-zone of each user during which access to the data stored in the storage apparatus is not made based on log-in and log-out requests from the user.

6. The file server according to claim 4, wherein the length of the first time zone is calculated by subtracting a length of a time period of the corresponding time-zones from a length of the time period needed for spin-down and spin-up to be performed in the RAID group.

7. A file management method for a storage system coupled to a client, the file management method comprising:

storing data in a plurality of volumes that form a plurality of RAID groups; and receiving file access requests from the client and controlling storage of file data in the storage apparatus;

defining a set of first users that have similar corresponding time-zones during which access to the data stored in the storage apparatus is not made as a first group;

relating the first group to a first RAID group of the plurality of RAID groups;

associating the first group with a first time-zone that is calculated based on a time-zone required for spin-down and spin-up to be performed in the first RAID group and the corresponding time-zones during which access to the data stored in the storage apparatus is not made for the set of first users;

migrating data of a file accessed by a user of the set of first users to the first RAID group; and operating the first RAID group in a power saving state during the first time-zone, and wherein a length of the first time-zone is determined in accordance with both a length of the corresponding time-zones and a length of a time period needed for spin-down and spin-up to be performed in the RAID group, and wherein the power saving state is a spin-down state.

8. The file management method according to claim 7, further comprising managing the corresponding time-zone of each user access to the data stored in the storage apparatus is not made based on log-in and log-out requests from the user.

9. The file management method according to claim 7, wherein the length of the first time zone is calculated by subtracting a length of a time period of the corresponding time-zones from a length of the time period needed for spin-down and spin-up to be performed in the RAID group.

* * * * *